(12) United States Patent
Chun et al.

(10) Patent No.: US 12,238,442 B2
(45) Date of Patent: Feb. 25, 2025

(54) IMAGE SENSOR PERFORMING SELECTIVE MULTIPLE SAMPLING AND OPERATING METHOD THEREOF

(71) Applicant: Samsung Electronics Co., Ltd., Suwon-si (KR)

(72) Inventors: Chanho Chun, Suwon-si (KR); Kyung-Min Kim, Suwon-si (KR); Min-Sun Keel, Suwon-si (KR); Donghyun Kim, Suwon-si (KR); Mira Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 109 days.

(21) Appl. No.: 18/335,488

(22) Filed: Jun. 15, 2023

(65) Prior Publication Data

US 2024/0048869 A1 Feb. 8, 2024

(30) Foreign Application Priority Data

Aug. 2, 2022 (KR) .................. 10-2022-0096355
Jan. 17, 2023 (KR) .................. 10-2023-0007001

(51) Int. Cl.
*H04N 25/772* (2023.01)
*H04N 25/59* (2023.01)
(Continued)

(52) U.S. Cl.
CPC .......... *H04N 25/772* (2023.01); *H04N 25/59* (2023.01); *H04N 25/616* (2023.01); *H04N 25/65* (2023.01);
(Continued)

(58) Field of Classification Search
CPC .... H04N 25/772; H04N 25/59; H04N 25/616; H04N 25/65; H04N 25/771;
(Continued)

(56) References Cited

U.S. PATENT DOCUMENTS 7,554,479 B2   6/2009   Lim
8,462,246 B2   6/2013   Lee et al.
(Continued)

FOREIGN PATENT DOCUMENTS

KR       100826513 B1    5/2008
WO    WO-2022/075119 A1   4/2022

*Primary Examiner* — Nicholas G Giles
(74) *Attorney, Agent, or Firm* — Harness, Dickey & Pierce, P.L.C.

(57) ABSTRACT

Disclosed is an image sensor including a pixel array including a plurality of pixels, each of the pixels including a first photodiode and a second photodiode, each of which outputs a first pixel signal based on a first conversion gain using the second photodiode in a first period, outputs a second pixel signal based on a second conversion gain using the second photodiode in a second period, outputs a third pixel signal based on the first conversion gain using the first photodiode in a third period, and outputs a fourth pixel signal based on the second conversion gain using the first photodiode in a fourth period, an ADC circuit that performs sampling on a reset signal and an image signal of each of the first to fourth pixel signal. A sampling count and the number of sampling bits are adjusted differently from each of the first to fourth period.

20 Claims, 20 Drawing Sheets

(51) Int. Cl.
    *H04N 25/616* (2023.01)
    *H04N 25/65* (2023.01)
    *H04N 25/76* (2023.01)
    *H04N 25/771* (2023.01)
(52) U.S. Cl.
    CPC ....... *H04N 25/771* (2023.01); *H04N 25/7795* (2023.01)
(58) Field of Classification Search
    CPC .... H04N 25/7795; H04N 25/51; H04N 25/78; H04N 25/618; H04N 25/585
    See application file for complete search history.

(56) References Cited

U.S. PATENT DOCUMENTS

| | | |
|---|---|---|
| 9,191,026 B2 | 11/2015 | Oike et al. |
| 9,521,351 B1 | 12/2016 | Endsley et al. |
| 9,681,071 B2 | 6/2017 | Smith et al. |
| 10,070,084 B2 | 9/2018 | Guidash et al. |
| 10,594,973 B2 | 3/2020 | Vogelsang et al. |
| 11,212,473 B2 * | 12/2021 | Kuroda ................ H04N 25/633 |
| 2011/0074994 A1 | 3/2011 | Wakabayashi et al. |
| 2014/0160334 A1 | 6/2014 | Wakabayashi |
| 2021/0044768 A1 * | 2/2021 | Kuroda ................ H04N 25/78 |
| 2022/0217291 A1 | 7/2022 | Kim et al. |
| 2023/0300488 A1 | 9/2023 | Suzuki et al. |

\* cited by examiner

IMAGE SENSOR PERFORMING SELECTIVE MULTIPLE SAMPLING AND OPERATING METHOD THEREOF

CROSS-REFERENCE TO RELATED APPLICATIONS

This application claims priority under 35 U.S.C. § 119 to Korean Patent Application Nos. 10-2022-0096355 filed on Aug. 2, 2022, in the Korean Intellectual Property Office, and 10-2023-0007001 filed on Jan. 17, 2023, in the Korean Intellectual Property Office, the disclosures of which are incorporated by reference herein in their entireties.

BACKGROUND

Example embodiments of the present disclosure described herein relate to an electronic device, and more particularly, relate to an image sensor that performs selective multiple sampling and an operating method thereof.

An image sensor includes a charge coupled device (CCD) image sensor, a complementary metal-oxide semiconductor (CMOS) image sensor (CIS), etc. The CMOS image sensor includes pixels implemented with CMOS transistors and converts light energy into an electrical signal by using a photoelectric conversion element included in each pixel. The CMOS image sensor obtains information about a captured/photographed image by using the electrical signal generated by each pixel.

SUMMARY

Example embodiments of the present disclosure provide an image sensor that performs selective multiple sampling for noise reduction that minimizes frame rate reduction, and an operating method thereof.

According to an example embodiment, an image sensor includes a pixel array including a plurality of pixels, each of the plurality of pixels including a first photodiode and a second photodiode, the first photodiode having a first light receiving area, the second photodiode having a second light receiving area greater than the first light receiving area, and each of the plurality of pixels configured to output a first pixel signal based on a first conversion gain by using the second photodiode in a first period, output a second pixel signal based on a second conversion gain by using the second photodiode in a second period, output a third pixel signal based on the first conversion gain by using the first photodiode in a third period, and output a fourth pixel signal based on the second conversion gain by using the first photodiode in a fourth period, an analog-to-digital converter (ADC) circuit configured to output a digital signal by performing sampling on a reset signal and an image signal of each of the first pixel signal, the second pixel signal, the third pixel signal, and the fourth pixel signal, and a timing controller that controls an operation of the ADC circuit. The first conversion gain is higher than the second conversion gain. The timing controller is configured to adjust a sampling count and a number of sampling bits associated with the sampling differently from each of the first period, the second period, the third period, and the fourth period, and the timing controller includes a register for adjusting the sampling count and the number of sampling bits.

According to an example embodiment, an image sensor includes a pixel array including a plurality of pixels and outputting a pixel signal from the plurality of pixels, an ADC circuit that outputs a digital signal by performing sampling on a reset signal and an image signal of the pixel signal, and a timing controller that controls an operation of the ADC circuit. Each of the plurality of pixels includes a first photodiode having a first light receiving area, a second photodiode having a second light receiving area greater than the first light receiving area, a capacitor connected to a first floating diffusion region configured to store a charge generated by the first photodiode, a first transistor connected to the capacitor, a second transistor connected between the first floating diffusion region and a second floating diffusion region, and a third transistor connected between the second floating diffusion region and a third floating diffusion region configured to store a charge generated by the second photodiode. The timing controller is configured to adjust a sampling count and a number of sampling bits associated with the sampling differently based on whether each of the first transistor, the second transistor, and the third transistor is turned on, and the timing controller includes a register for adjusting the sampling count and the number of sampling bits.

According to an example embodiment, an operating method of an image sensor includes sampling a first pixel signal, the first pixel signal being generated based on a first conversion gain by using a second photodiode in a first period, as a first sampling bit by a first sampling count, sampling a second pixel signal, the second pixel signal being generated based on a second conversion gain lower than the first conversion gain by using the second photodiode in a second period, as a second sampling bit by a second sampling count, sampling a third pixel signal, is the third pixel signal being generated based on the first conversion gain by using a first photodiode having a first light receiving area smaller than the second light receiving area of the second photodiode in a third period, as a third sampling bit by a third sampling count, sampling a fourth pixel signal, the fourth pixel signal is generated based on the second conversion gain by using the first photodiode in a fourth period, as a fourth sampling bit by a fourth sampling count, and outputting a digital signal based on the sampled pixel signals and generating image data based on the digital signal.

According to an example embodiment, an electronic device includes an image sensor and an application processor. The image sensor includes a pixel array including a plurality of pixels, each of the plurality of pixels including a first photodiode and a second photodiode, the first photodiode having a first light receiving area, the second photodiode having a second light receiving area greater than the first light receiving area, and each of the plurality of pixels configured to output a first pixel signal based on a first conversion gain by using the second photodiode in a first period, output a second pixel signal based on a second conversion gain by using the second photodiode in a second period, output a third pixel signal based on the first conversion gain by using the first photodiode in a third period, and output a fourth pixel signal based on the second conversion gain by using the first photodiode in a fourth period, an ADC circuit configured to output a digital signal by performing sampling on a reset signal and an image signal of each of the first pixel signal, the second pixel signal, the third pixel signal, and the fourth pixel signal, and a timing controller that controls an operation of the ADC circuit. The first conversion gain is higher than the second conversion gain. A sampling count and a number of sampling bits associated with the sampling are adjusted differently from each of the first period, the second period, the third period, and the fourth period. The application processor adjusts the sampling count and the number of sampling bits by setting a value of a register included in the timing controller.

BRIEF DESCRIPTION OF THE FIGURES

The above and other objects and features of the present disclosure will become apparent by describing in detail example embodiments thereof with reference to the accompanying drawings.

DETAILED DESCRIPTION

Hereinafter, example embodiments of the present disclosure will be described in detail and clearly to such an extent that an ordinary one in the art easily implements the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
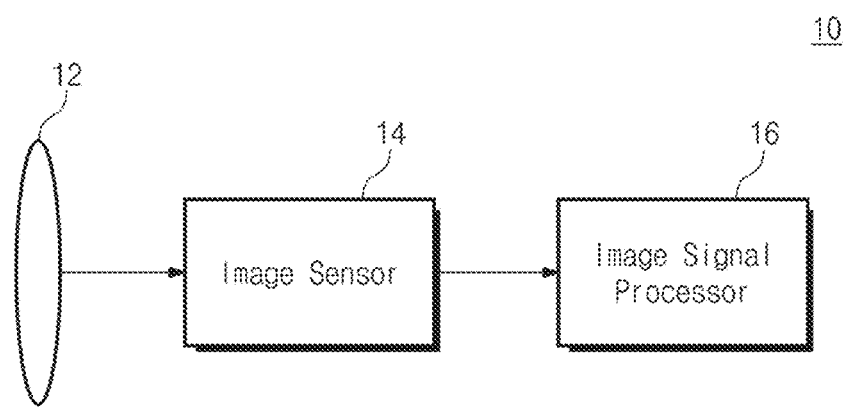
FIG. 1 illustrates an example of a configuration of an image processing system, according to an example embodiment of the present disclosure.

FIG. 1 illustrates an example of a configuration of an image processing system 10, according to an example embodiment of the present disclosure. For example, the image processing system 10 may be implemented as a part of various electronic devices such as a camera, a smartphone, a wearable device, an Internet of things (IoT) device, a home appliance, a tablet personal computer (PC), a personal digital assistant (PDA), a portable multimedia player (PMP), a navigation system, a drone, an advanced drivers assistance system (ADAS), and the like. Moreover, the image processing system 10 may be mounted on an electronic device provided as a part of a vehicle, furniture, a manufacturing facility, a door, and various measuring devices. Referring to FIG. 1, the image processing system 10 may include a lens 12, an image sensor 14, and an image signal processor 16.

A light may be reflected by an object, a scenery, etc. targeted for photographing, and the lens 12 may receive the reflected light. The image sensor 14 may generate an electrical signal based on the light received through the lens 12. For example, the image sensor 14 may be implemented with a complementary metal-oxide semiconductor (CMOS) image sensor or the like.

The image sensor 14 may include a pixel array. Pixels of the pixel array may generate pixel values by converting light into electrical signals. A rate at which light is converted into an electrical signal (e.g., a voltage) may be defined as a conversion gain. Under a low conversion gain mode and a high conversion gain mode, the pixel array may generate a pixel signal by using a dual conversion gain for changing the conversion gain. Moreover, each pixel of the pixel array may have a split photodiode structure. A configuration of the image sensor 14 will be described in more detail with reference to FIG. 2.

The image signal processor 16 may perform preprocessing on the electrical signal output from the image sensor 14 and then may generate image data related to the captured object or landscape by appropriately processing the preprocessed electrical signal. To this end, the image signal processor 16 may perform various pieces of processing such as color correction, auto white balance, gamma correction, color saturation correction, bad pixel correction, and hue correction.

FIG. 1 illustrates the one lens 12 and the one image sensor 14. However, in another example embodiment, the image processing system 10 may include a plurality of lenses and a plurality of image sensors. In this case, the plurality of lenses may have different fields of view. Also, the plurality of image sensors may have different functions, different performances, and/or different characteristics, and may respectively include pixel arrays of different configurations.

Figure 2:
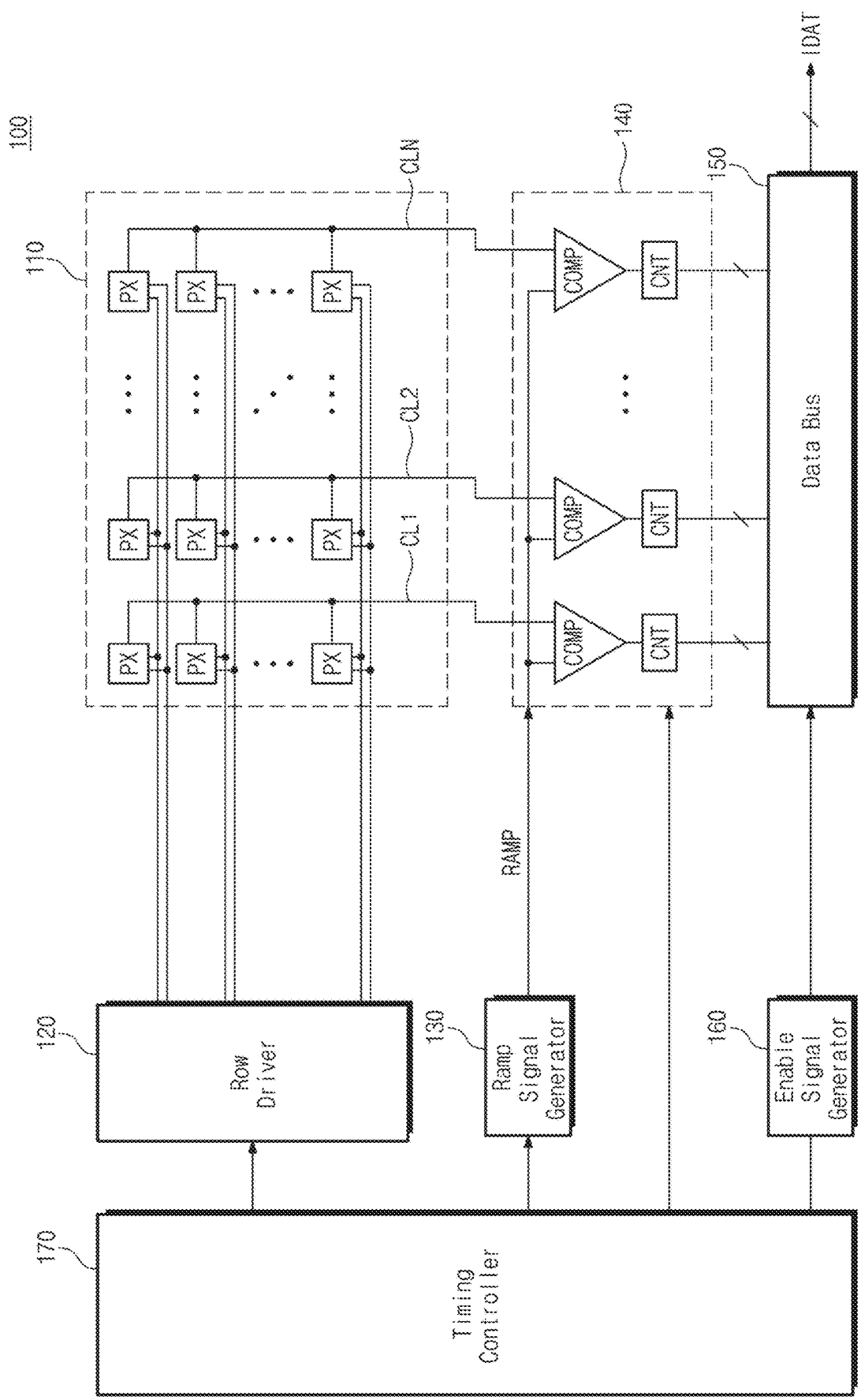
FIG. 2 illustrates an example of a configuration of an image sensor of FIG. 1.

FIG. 2 illustrates an example of a configuration of the image sensor 14 of FIG. 1. Referring to FIG. 2, an image sensor 100 may include a pixel array 110, a row driver 120, a ramp signal generator 130, an analog-to-digital converter (ADC) circuit 140, a data bus 150, an enable signal generator 160, and a timing controller 170.

The pixel array 110 may include a plurality of pixels PX positioned in a matrix form in rows and columns ('N' rows and 'N' columns (e.g., N×N)). Each of (or alternatively, at least one of) the plurality of pixels PX may include a photoelectric conversion element. For example, the photoelectric conversion element may include a photodiode, a photo transistor, a photo gate, a pinned photodiode, etc. Each of (or alternatively, at least one of) the plurality of pixels PX may include a plurality of photoelectric conversion elements.

Each of (or alternatively, at least one of) the plurality of pixels PX according to an example embodiment of the present disclosure may be the pixel PX having a split photodiode structure including at least two or more photodiodes. Here, two or more photodiodes may operate independently of each other. For example, the pixel PX may include a small photodiode (SPD) having a small light receiving area and a large photodiode (LPD) having a light receiving area larger than the small photodiode.

The large photodiode and the small photodiode may selectively operate based on the illumination around an object. For example, the large photodiode may operate to generate a pixel signal in a low-illumination environment, and the small photodiode may operate to generate a pixel signal in a high-illumination environment by increasing an exposure time. Moreover, each of (or alternatively, at least one of) the large photodiode and the small photodiode may operate in one of a high conversion gain mode or a low conversion gain mode. The configuration and operation of the pixel PX having a split photodiode structure will be described in detail with reference to FIG. 3.

Furthermore, according to an example embodiment of the present disclosure, the sampling count (or a sampling number of times) and the number of sampling bits may be selectively adjusted for each mode (a high conversion gain mode and a low conversion gain mode of a large photodiode, a high conversion gain mode and a low conversion gain mode of a small photodiode). For example, a sampling count and the number of sampling bits may be adjusted by a register of the timing controller 170.

In the meantime, a micro lens for condensing light may be disposed on each of (or alternatively, at least one of) the plurality of pixels PX or each pixel group composed of adjacent pixels PX. Each of (or alternatively, at least one of) the plurality of pixels PX may detect light in a specific spectral region from light received through the micro lens. For example, the pixel array 110 may include a red pixel for converting a light of a red spectral region into an electrical signal, a green pixel for converting a light of a green spectral region into an electrical signal, or a blue pixel for converting a light of a blue spectral region into an electrical signal. A color filter for transmitting light in a specific spectral region may be disposed on each of (or alternatively, at least one of) the plurality of pixels PX. However, the present disclosure is not limited thereto. For example, in addition to red, green, and blue, the pixel array 110 may include pixels that convert light in a spectral region into an electrical signal.

Each of (or alternatively, at least one of) the plurality of pixels PX of the pixel array 110 may output a pixel signal through corresponding column lines CL1 to CLN, based on the intensity or the amount of light received from the outside. Each of (or alternatively, at least one of) the plurality of column lines CL1 to CLN extends in a column direction and may be connected to the pixels PX disposed in the same column. For example, the pixel signal may be an analog signal corresponding to the intensity or the amount of light received from the outside. The pixel signal may pass through a voltage buffer (e.g., a source follower) and may then be provided to the ADC circuit 140 through the column lines CL1 to CLN.

The row driver 120 may select and drive a row of the pixel array 110. The row driver 120 may decode an address and/or a control signal generated by the timing controller 170 and may generate control signals for selecting and driving the row of the pixel array 120. For example, the control signals may include a signal for selecting a pixel, a signal for resetting a floating diffusion region, a signal for transmitting charges to the floating diffusion region, and the like. In particular, the row driver 120 according to an example embodiment of the present disclosure may generate control signals for controlling a readout mode of each of (or alternatively, at least one of) a large photodiode and a small photodiode of the pixel PX and may provide the control signals to the pixel array 110.

The ramp signal generator 130 may generate a ramp signal under control of the timing controller 170. For example, the ramp signal generator 130 may operate in response to a control signal such as a ramp enable signal. When the ramp enable signal is activated, the ramp signal generator 130 may generate the ramp signal based on preset values (e.g., a desired value such as a start level, an end level, and a slope). In other words, the ramp signal may be a signal that increases or decreases based on a preset slope during a specific time. Furthermore, the ramp signal according to an example embodiment of the present disclosure may be adjusted differently based on the above-described change in the sampling count and the number of sampling bits for each mode of the pixel PX. The ramp signal may be provided to the ADC circuit 140.

The ADC circuit 140 may receive a pixel signal from the plurality of pixels PX of the pixel array 110 through the column lines CL1 to CLN and may receive a ramp signal from the ramp signal generator 130. The ADC circuit 140 may obtain a reset signal and an image signal from the received pixel signal and may extract a difference between the reset signal and the image signal as an effective signal component. The ADC circuit 140 may include a plurality of comparators COMP and a plurality of counters CNT.

In detail, each of (or alternatively, at least one of) the comparators COMP may compare the reset signal of the pixel signal and a ramp signal RAMP, may compare the image signal of the pixel signal with the ramp signal RAMP, and may perform sampling on the comparison result. For example, the comparators COMP may be implemented by using an operational transconductance amplifier (OTA). Each of (or alternatively, at least one of) the counters CNT may output the counting result as a digital signal by counting pulses of the signal experiencing the correlated double sampling and may provide the counting result to the data bus 150.

The data bus 150 may output image data IDAT based on a digital signal received from the ADC circuit 140. For example, the data bus 150 may include a plurality of memories, a sense amplifier, and a column decoder. The plurality of memories may temporarily store the digital signal output from the digital counters CNT, and the sense amplifier may sense and amplify the digital signal stored in the plurality of memories. An operation of storing the digital signal in the plurality of memories and loading the stored digital signal may be performed under control of the enable signal generator 160. Under control of the column decoder, the amplified digital signal may be transmitted to the image signal processor 16 of FIG. 1 as the image data IDAT.

The enable signal generator 160 may generate read/write select signals and read/write enable signals for controlling an operation (e.g., a write operation) of temporarily storing a digital signal in a plurality of memories included in the data bus 150 and an operation (e.g., a read operation) of loading the digital signal from the plurality of memories for the output of the image data IDAT.

The timing controller 170 may generate a control signal and/or a clock for controlling the operation and/or timing of each of (or alternatively, at least one of) the row driver 120, the ramp signal generator 130, the ADC circuit 140, and the enable signal generator 160. In particular, the timing controller 170 of the present disclosure may include a register for adjusting the sampling count and the number of sampling bits for each readout mode of the pixel PX. For example, the timing controller 170 may control the row driver 120, the ramp signal generator 130, the ADC circuit 140, and the enable signal generator 160 based on the sampling count and the number of sampling bits, which are set by the register.

Figure 3:
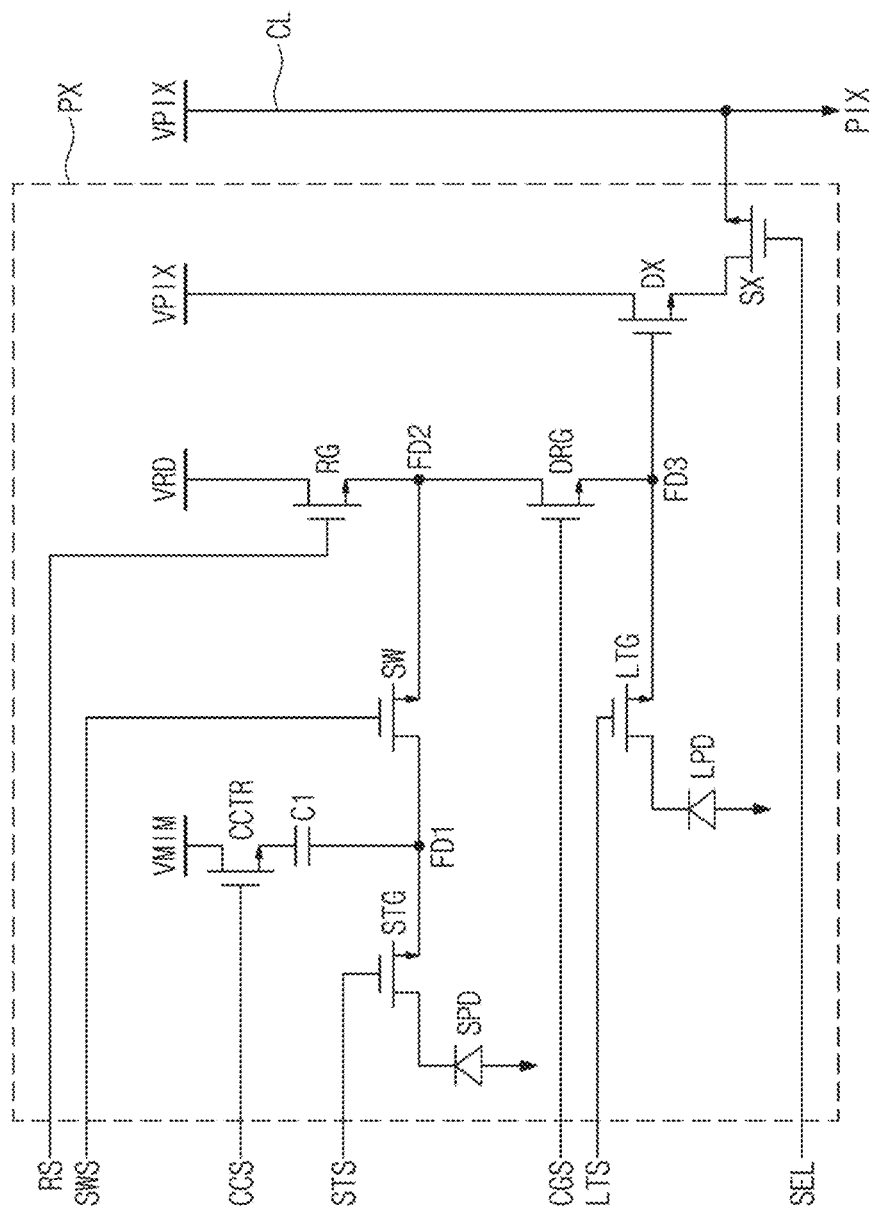
FIG. 3 is a circuit diagram illustrating an example of one of pixels of a pixel array of FIG. 2.

FIG. 3 is a circuit diagram illustrating an example of one of the pixels PX of the pixel array 110 of FIG. 2. Referring to FIG. 3, the pixel PX may include a large photodiode LPD, a small photodiode SPD, a large transfer transistor LTG, a small transfer transistor STG, a reset transistor RG, a driving transistor DX, a selection transistor SX, a conversion gain control transistor DRG, a switch transistor SW, a capacitor control transistor CCTR, and a capacitor C1.

Moreover, referring to FIG. 3, a voltage applied to the pixel PX may include a pixel voltage VPIX, a capacitor power supply voltage VMIM, and a reset power supply voltage VRD. Each of (or alternatively, at least one of) the capacitor power supply voltage VMIM and the reset power supply voltage VRD may be supplied identically to the pixel voltage VPIX or may be supplied through a separate circuit. Furthermore, a parasitic capacitor may be formed by floating diffusion regions FD1, FD2, and FD3.

A photodiode may convert light incident from the outside into an electrical signal. The photodiode may generate charges based on the intensity of light. The amount of charge generated by the photodiode may be variable based on the illumination around an object. As described above, the photodiode may be classified into the large photodiode LPD having a large light receiving area and the small photodiode SPD having a small light receiving area based on a light receiving area. That is, the pixel PX may have a split photodiode structure including the large photodiode LPD and the small photodiode SPD.

The large transfer transistor LTG may be driven by a large transfer control signal LTS. The large transfer transistor LTG may transmit charges generated by the large photodiode LPD to the third floating diffusion region FD3. Furthermore, when the conversion gain control transistor DRG is turned on, the large transfer transistor LTG may transmit charges generated by the large photodiode LPD to the second floating diffusion region FD2 as well as the third floating diffusion region FD3. One end of the large transfer transistor LTG may be connected to the large photodiode LPD, and the other end thereof may be connected to the third floating diffusion region FD3.

The small transfer transistor STG may be driven by a small transfer control signal STS. The small transfer transistor STG may transmit charges generated by the small photodiode SPD to the first floating diffusion region FD1. One end of the small transfer transistor STG may be connected to the small photodiode SPD, and the other end thereof may be connected to the first floating diffusion region FD1.

The switch transistor SW may be driven by a switch control signal SWS. The switch transistor SW may be turned on to generate a pixel signal PIX by using the small photodiode SPD and may be turned off to generate the pixel signal PIX by using the large photodiode LPD. One end of the switch transistor SW may be connected to the first floating diffusion region FD1, and the other end thereof may be connected to the second floating diffusion region FD2.

When the large photodiode LPD is used, the conversion gain control transistor DRG may be driven by a conversion gain control signal CGS. When the conversion gain control transistor DRG is turned on, a parasitic capacitor formed in the third floating diffusion region FD3 and a parasitic capacitor formed in the second floating diffusion region FD2 are connected in parallel to increase the capacitance of the floating diffusion regions. When the capacitance of floating diffusion regions increases, the conversion gain decreases. When the capacitance of floating diffusion regions decreases, the conversion gain increases. Accordingly, a conversion gain at a point in time when the conversion gain control transistor DRG is turned off may be higher than a conversion gain at a point in time when the conversion gain control transistor DRG is turned on. One end of the conversion gain control transistor DRG may be connected to the second floating diffusion region FD2, and the other end thereof may be connected to the third floating diffusion region FD3.

When the small photodiode SPD is used, the capacitor control transistor CCTR may be driven by a capacitor control signal CCS. When the capacitor control transistor CCTR is turned on, the capacitor C1 may be connected in parallel with the parasitic capacitor formed in the first floating diffusion region FD1 to increase the capacitance of the first floating diffusion region FD1. Accordingly, a conversion gain at a point in time when the capacitor control transistor CCTR is turned off may be higher than a conversion gain at a point in time when the capacitor control transistor CCTR is turned on. One end of the capacitor control transistor CCTR may be connected to the capacitor C1, and the other end thereof may be connected to the capacitor power supply voltage VMIM. For example, the capacitor C1 may be a passive element having a fixed or variable capacitance, and may store lateral overflow charges overflowing in the small photodiode SPD.

The reset transistor RG may be driven by a reset control signal RS and may provide the reset power supply voltage VRD to the floating diffusion regions FD2 and FD3. Furthermore, when the switch transistor SW is turned on, the reset transistor RG may also provide the reset power supply voltage VRD to the first floating diffusion region FD1. Accordingly, charges accumulated in the floating diffusion regions FD1, FD2, and FD3 may move to a terminal to which the reset power supply voltage VRD is applied, and voltages of the floating diffusion regions FD1, FD2, and FD3 may be reset.

The driving transistor DX may operate as a source follower based on a bias current generated by a current source (not shown) connected to a column line CL and may generate the pixel signal PIX by amplifying the voltages of the floating diffusion regions FD1, FD2, and FD3. The selection transistor SX may be driven by a selection signal SEL and may select pixels to be read in units of row. When the selection transistor SEL is turned on, the pixel signal PIX may be output to the ADC circuit 140 of FIG. 2 through the column line CL.

As a result, the pixel PX of FIG. 3 may generate the pixel signal PIX by using one of the large photodiode LPD or the small photodiode SPD. Moreover, the large photodiode LPD may operate in one of a high conversion gain mode or a low conversion gain mode based on whether the conversion gain control transistor DRG is turned on or off. The small photodiode SPD may operate in one of a high conversion gain mode or a low conversion gain mode based on whether the capacitor control transistor CCTR is turned on or off.

That is, the pixel PX of FIG. 3 may generate the pixel signal PIX in a total of four readout modes based on illumination. In detail, in a first period having the lowest illuminance, the large photodiode LPD may operate in a high conversion gain mode (hereinafter referred to as an "LPD_HCG mode"). In a second period having illuminance higher than the first period, the large photodiode LPD may operate in a low conversion gain mode (hereinafter referred to as an "LPD_LCG mode"). Moreover, in a third period having illumination higher than the second period, the small photodiode SPD may operate in a high conversion gain mode (hereinafter referred to as an "SPD_HCG mode"). In a fourth period having the highest illumination, the small photodiode SPD may operate in a low conversion gain mode (hereinafter referred to as an "SPD_LCG mode").

As such, because the pixel PX is capable of detecting both low and high light levels based on the illumination by using the large photodiode LPD and the small photodiode SPD that are capable of operating in a dual conversion gain mode, a dynamic range of the image sensor 100 of FIG. 2 may increase. Furthermore, the pixel PX may operate sequentially in the LPD_HCG mode, the LPD_LCG mode, the SPD_HCG mode, and the LCG mode, the image sensor 100 of FIG. 2 may generate a high dynamic range (HDR) image by merging all the pieces of image data IDAT according to the modes.

Furthermore, according to an example embodiment of the present disclosure, the sampling count and the number of sampling bits of each readout mode may be selectively adjusted. For example, noise may be reduced and the signal-to-noise ratio (SNR) may be improved by increasing the sampling count of each mode. However, as the readout time increases, the frame rate may decrease. A decrease in the frame rate may be minimized by reducing the number of sampling bits.

Figure 4:
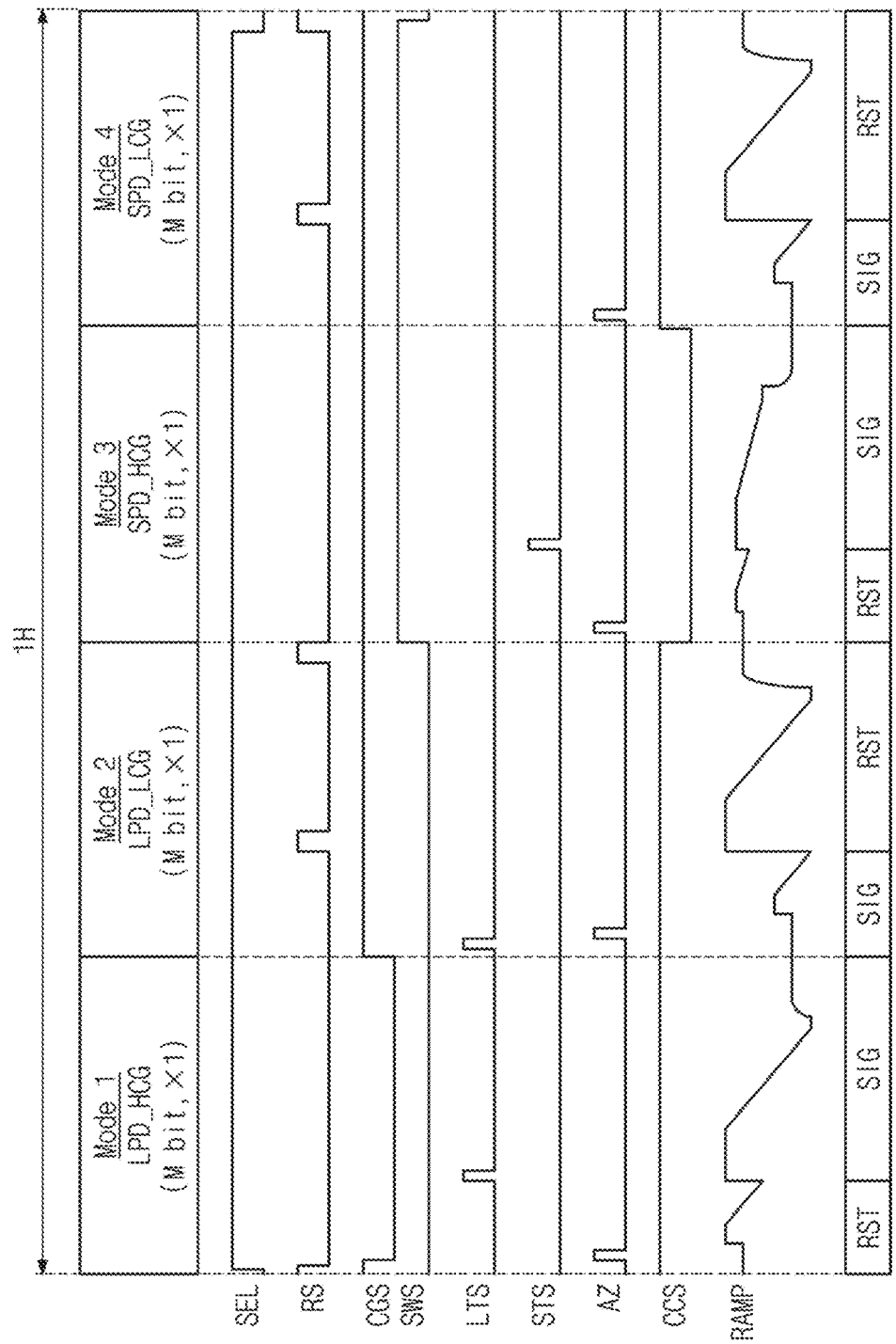
FIG. 4 is a timing diagram illustrating an example of a readout operation of a pixel of FIG. 3.

FIG. 4 is a timing diagram illustrating an example of a readout operation of the pixel PX of FIG. 3. Referring to FIGS. 3 and 4, one readout operation may include a plurality of periods corresponding to different readout modes LPD_HCG, LPD_LCG, SPD_HCG, and SPD_LCG. The total time required (or alternatively, used) for one readout operation may be defined as 1H time. Each of (or alternatively, at least one of) the plurality of periods may include a period RST for outputting a reset signal of the pixel signal PIX and a period SIG for outputting an image signal of the pixel signal PIX. Basically, it is assumed that a sampling count (e.g., the number of times that the reset signal and the ramp signal are compared with each other or the number of times that the image signal and the ramp signal are compared with each other) of each mode is one time and the number of sampling bits is 'M' bits (e.g., 12 bits).

Referring to FIG. 4, the selection transistor SX of the pixel PX performing the readout operation may be turned on in response to the selection signal SEL having a high level. Moreover, during the LPD_HCG mode and the LPD_LCG mode where the large photodiode LPD is used, the switch transistor SW may be turned off in response to the switch control signal SWS of a low level. During the SPD_HCG mode and the SPD_LCG mode where the small photodiode SPD is used, the switch transistor SW may be turned on in response to the switch control signal SWS of a high level. Besides, whenever each of (or alternatively, at least one of) the modes is started, amplifiers included in the ADC circuit 140 of FIG. 2 may be initialized in response to an auto zero signal AZ of a high level.

During the LPD_HCG mode being a first mode, after a reset signal according to a reset period RST is first output, an image signal according to the signal period SIG may be output (RST-SIG). Referring to FIG. 4, as the reset transistor RG is turned on in response to the reset control signal RS of a high level in the reset period RST of the LPD_HCG mode, the third floating diffusion region FD3 may be reset, and a reset signal of a pixel signal corresponding to a high conversion gain may be read out.

Afterward, in the signal period SIG, charges generated by the large photodiode LPD may be transmitted to the third floating diffusion region FD3 through the large transfer transistor LTG in response to the large transfer control signal LTS of a high level, and an image signal of a pixel signal corresponding to a high conversion gain may be read out. Afterward, the conversion gain control transistor DRG may be turned on in response to a conversion gain control signal CGS of the level.

During the LPD_LCG mode being a second mode, after an image signal according to the signal period SIG is first output, a reset signal according to the reset period RST may be output (SIG-RST). Referring to FIG. 4, in the signal period SIG, the charge generated by the large photodiode LPD may be transmitted to the third floating diffusion region FD3 through the large transfer transistor LTG in response to the large transfer control signal LTS of a high level, and an image signal of a pixel signal corresponding to a low conversion gain may be read out. Afterward, as the reset transistor RG is turned on in response to the reset control signal RS of a high level in the reset period RST, the third floating diffusion region FD3 may be reset, and a reset signal of a pixel signal corresponding to a low conversion gain may be read out.

During the SPD_HCG mode being a third mode, after a reset signal according to a reset period RST is first output, an image signal according to the signal period SIG may be output (RST-SIG). Referring to FIG. 4, the reset transistor RG may be turned on in response to the reset control signal RS of a high level in the reset period RST, and the second floating diffusion region FD2 and the third floating diffusion region FD3 may be reset. While the second floating diffusion region FD2 and the third floating diffusion region FD3 are reset, the switch transistor SW may be turned on in response to the switch control signal SWS of a high level, and a reset signal of a pixel signal corresponding to a high conversion gain may be read out. Moreover, the capacitor control transistor CCTR may be turned off in response to the capacitor control signal CCS of a low level.

Afterward, in the signal period SIG, charges generated by the small photodiode SPD may be transmitted to the first floating diffusion region FD1 through the small transfer transistor STG in response to the small transfer control signal STS of a high level, and an image signal of a pixel signal corresponding to a high conversion gain may be read out. Afterward, the capacitor control transistor CCTR may be turned on in response to the capacitor control signal CCS of a high level.

During the SPD_LCG mode being a fourth mode, after an image signal according to the signal period SIG is first output, a reset signal according to the reset period RST may be output (SIG-RST). Referring to FIG. 4, in the signal period SIG, lateral overflow charges stored in the capacitor C1 may be transmitted to the first floating diffusion region FD1, and an image signal of a pixel signal corresponding to a low conversion gain may be read out. Afterward, as the reset transistor RG is turned on in response to the reset control signal RS of a high level in the reset period RST, the first floating diffusion region FD1, the capacitor C1, the second floating diffusion region FD2, and the third floating diffusion region FD3 may be reset, and a reset signal of a pixel signal corresponding to a low conversion gain may be read out.

The above-described LPD_HCG mode, LPD_LCG mode, SPD_HCG mode, and SPD_LCG mode may be readout modes corresponding to the first period, the second period, the third period, and the fourth period classified based on illumination with reference to FIG. 3, respectively. According to the LPD_HCG mode and the SPD_HCG mode among the above-mentioned readout modes, a reset signal may be read out first in the reset period RST and then an image signal may be read out in the signal period SIG (RST-SIG). This may be referred to as a "correlated double sampling (CDS) readout method". On the other hand, according to the LPD_LCG mode and the SPD_LCG mode, an image signal may be read out first in the signal period SIG, and then a reset signal may be read out in the reset period RST (SIG-RST). This may be referred to as an "incomplete CDS readout method".

In case of the CDS readout method (RST-SIG), because the reset signal and the image signal have KT/C noise components related to each other, KT/C noise may be removed through readout. However, in case of the incomplete CDS readout method (SIG-RST), because the reset signal and the image signal have different (unrelated) KT/C noise components, KT/C noise may not be removed through readout.

On the other hand, the operation order of a plurality of readout modes is not limited to that shown in FIG. 4. The readout operation of the small photodiode SPD may be performed before the readout operation of the large photodiode LPD. Alternatively, an operation of a low conversion gain mode may be performed before an operation of a high conversion gain mode. Moreover, in each mode, the order of the reset period RST and the signal period SIG is changed, or the reset period RST of a low conversion gain mode and the reset period RST of a high conversion gain mode proceed first, and then the signal period SIG of a high conversion gain mode and the signal period SIG of a low conversion gain mode may proceed.

As described above, the sampling count and the number of sampling bits of each readout mode according to an example embodiment of the present disclosure may be selectively adjusted to reduce noise and minimize frame time reduction. For example, the sampling count of each readout mode may increase from 1 time to 'K' times (1<K; for example, 1 time to 4 times), and the number of sampling bits thereof may be reduced from 'M' bits to 'N' bits (M>N; for example, from 12 bits to 10 bits). Furthermore, when the sampling count is adjusted, both the number of comparison operations of the reset period RST and the signal period SIG may be adjusted. However, only the number of comparison operations of either the reset period RST or the signal period SIG may be adjusted.

In this way, sampling performed twice or more during one readout mode is referred to as "multiple sampling". The multiple sampling may be selectively applied to each readout mode, and the number of sampling bits of each readout mode may also be adjusted to adjust 1H time (e.g., to adjust a frame rate). Due to an averaging effect through multiple sampling, noise included in the pixel signal PIX may be reduced and SNR may be improved. For example, the sampling count and the number of sampling bits for each mode related to multiple sampling may be adjusted in advance by a register included in the timing controller 170 of FIG. 2. Moreover, the slope, offset, and aspect of the ramp signal RAMP generated by the ramp signal generator 130 may also be adjusted.

In particular, dark random noise generated in an extreme low-illumination environment may be reduced through multiple sampling in the LPD_HCG mode, and KT/C noise that is incapable of being removed due to the incomplete CDS readout method may be reduced through multiple sampling in the SPD_LCG mode. Moreover, at the same time, a frame rate of a specific level or higher may be maintained. Hereinafter, example embodiments related to multiple sampling of the LPD_HCG mode for dark random noise reduction are described through FIGS. 5A, 5B, and 6A to 6C, and example embodiments related to multiple sampling of the SPD_LCG mode for KT/C noise reduction are described with reference to FIGS. 7A, 7B, and 8.

Figure 5A:
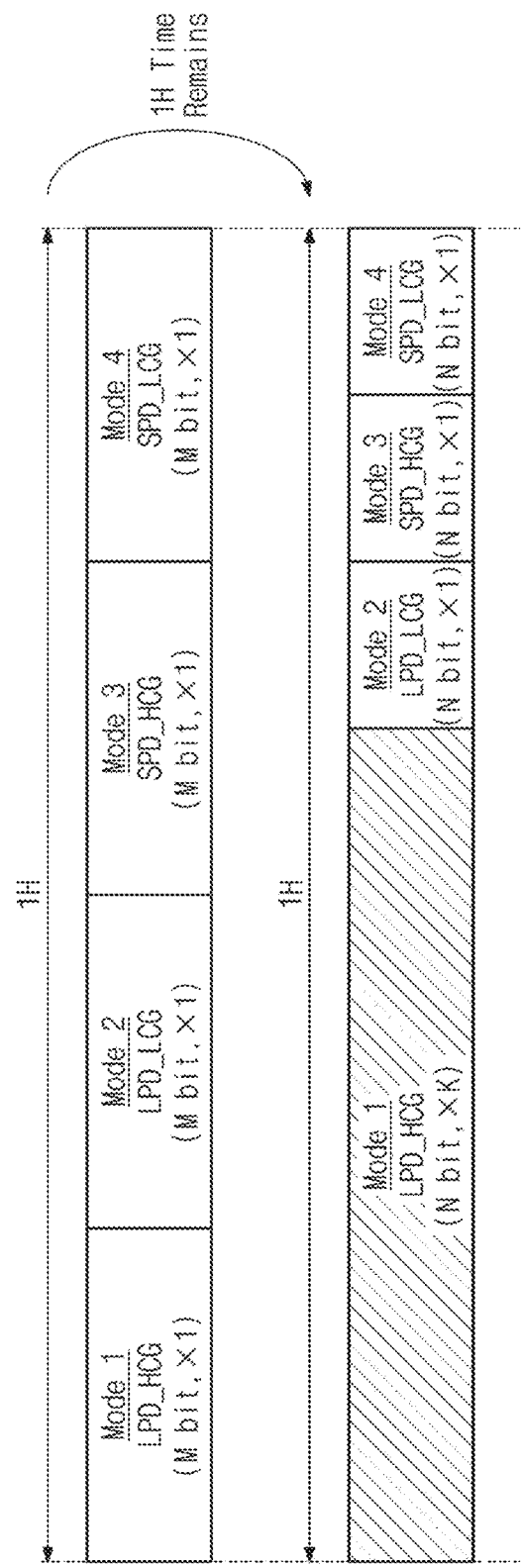
FIG. 5A shows an example of multiple sampling of LPD_HCG mode in which 1H time is maintained.
Figure 5B:
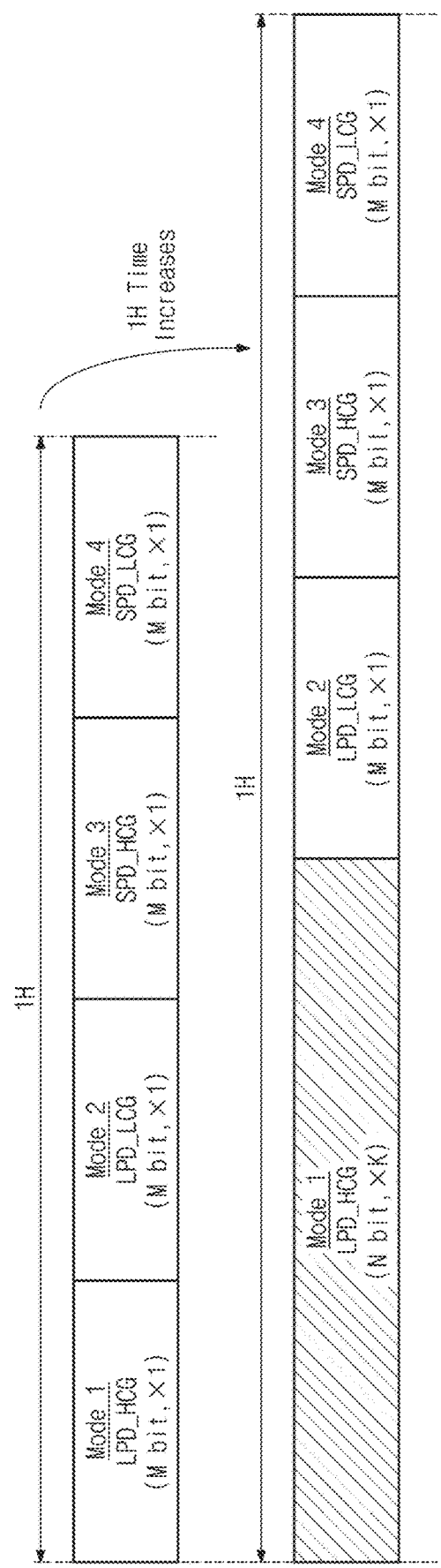
FIG. 5B shows an example of multiple sampling of LPD_HCG mode in which 1H time increases.

FIG. 5A shows an example of multiple sampling of LPD_HCG mode in which 1H time is maintained. FIG. 5B shows an example of multiple sampling of LPD_HCG mode in which 1H time increases. In the case of FIGS. 5A and 5B, both the number of comparison operations of the reset period RST and the number of comparison operations of the signal period SIG may increase to 'K' times.

Referring to FIG. 5A, a sampling count of the LPD_HCG mode increases from one time to 'K' times (1<K), and the number of sampling bits thereof may be reduced from 'M' bits to 'N' bits (M>N). Dark random noise may be reduced due to the averaging effect caused by increasing the sampling count of the LPD_HCG mode. However, as the sampling count increases from one time to 'K' times, the time required (or alternatively, used) for the LPD_HCG mode may increase. As the number of sampling bits of each of (or alternatively, at least one of) the remaining modes LPD_LCG, SPD_HCG, and SPD_LCG decreases from 'M' bits to 'N' bits, 1H time remains as shown in FIG. 4. As a result, a frame rate may be maintained together with the noise reduction effect.

In the meantime, referring to FIG. 5B, as illustrated in FIGS. 5A, the sampling count of the LPD_HCG mode may increase from one time to 'K' times, and the number of sampling bits thereof may decrease from 'M' bits to 'N' bits. However, unlike the illustration of FIG. as the number of sampling bits and the sampling count of each of (or alternatively, at least one of) the remaining modes LPD_LCG, SPD_HCG, and SPD_LCG are maintained even though the time required (or alternatively, used) for the LPD_HCG mode increases, 1H time increases compared to the example of FIG. 5A.

Comparing the example embodiment of FIG. 5A with the example embodiment of FIG. because the sampling count and sampling bit of LPD_HCG mode are the same, dark random noise reduction effect may be the same. In detail, in the case of FIG. 5A, as the number of sampling bits of each of (or alternatively, at least one of) the remaining modes is reduced to maintain the 1H time as shown in FIG. 4, the magnitude of a signal generated in each of (or alternatively, at least one of) the remaining modes may decrease. However, the effect of reducing noise may be greater due to the increase in the sampling count of the LPD_HCG mode even when the magnitude of the signal decreases, and thus SNR may be improved as compared to the example of FIG. 4. On the other hand, in the case of FIG. 5B, because the number of sampling bits of each of (or alternatively, at least one of) the remaining modes is maintained, the magnitude of the signal generated in each of (or alternatively, at least one of) the remaining modes does not decrease, and the improvement effect of SNR may be greater than that of FIG. 5A. However, as the 1H time increases, the frame rate may decrease as compared to that of FIG. 5A.

Figure 6A:
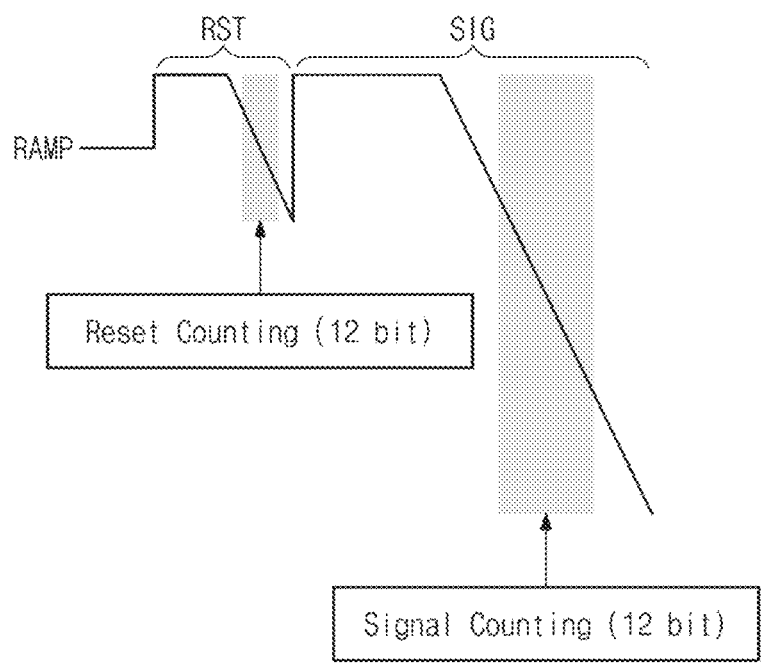
FIG. 6A shows an example of a reset period and a signal period in an LPD_HCG mode in which a sampling count corresponds to one time and the number of sampling bits corresponds to 12 bits.
Figure 6B:
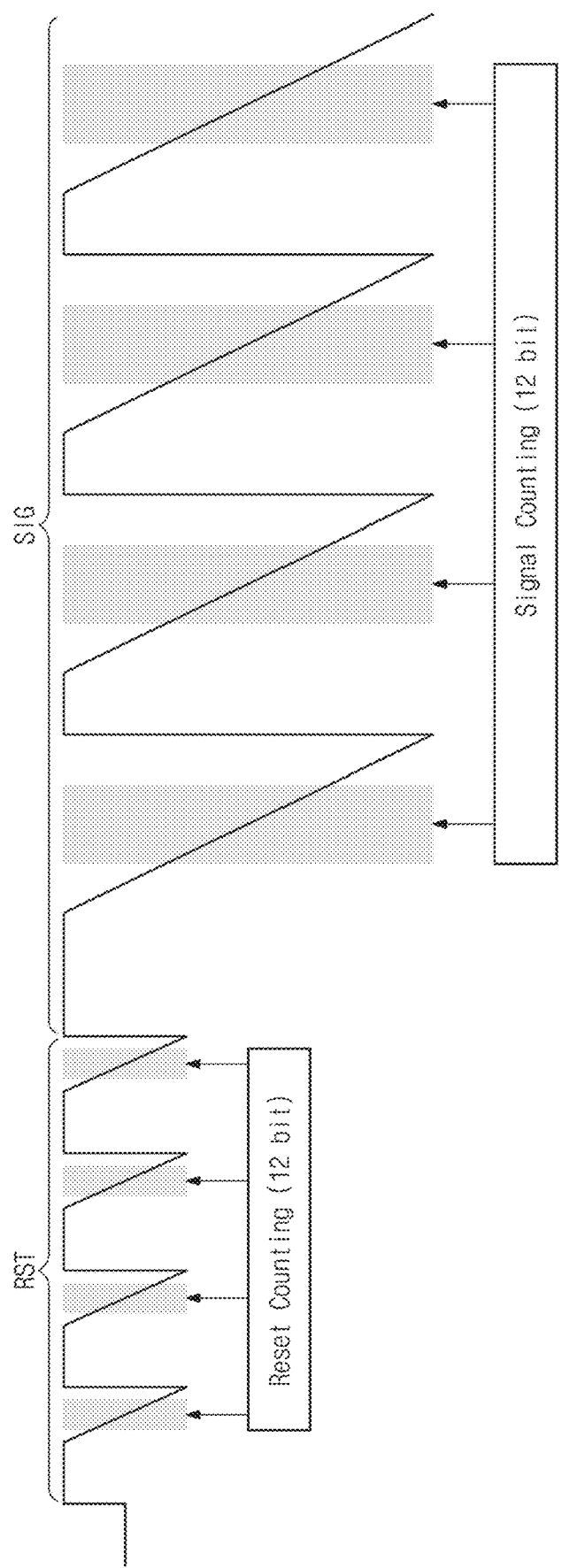
FIG. 6B shows an example of a reset period and a signal period in an LPD_HCG mode in which a sampling count corresponds to four times and the number of sampling bits corresponds to 12 bits.
Figure 6C:
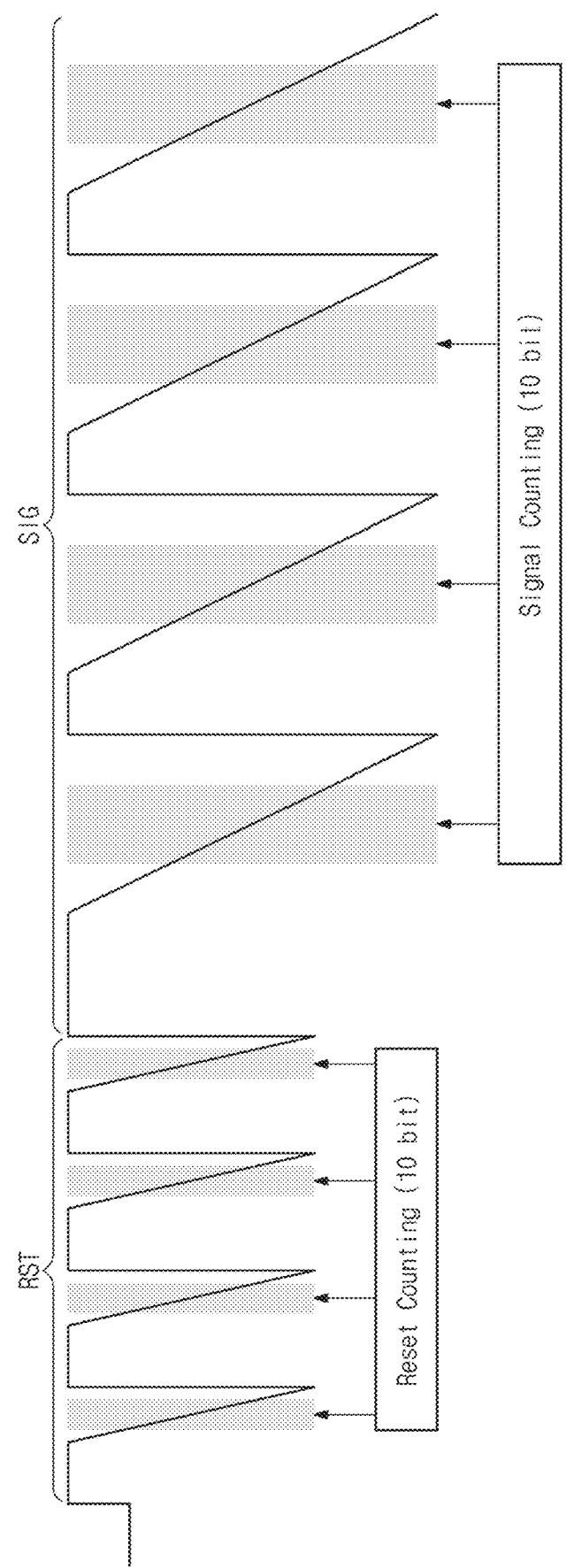
FIG. 6C shows an example of a reset period and a signal period in an LPD_HCG mode in which a sampling count corresponds to four times and the number of sampling bits corresponds to 10 bits.

FIG. 6A shows an example of the reset period RST and the signal period SIG in an LPD_HCG mode in which a sampling count corresponds to one time and the number of sampling bits corresponds to 12 bits. FIG. 6B shows an example of the reset period RST and the signal period SIG in an LPD_HCG mode in which a sampling count corresponds to four times and the number of sampling bits corresponds to 12 bits. FIG. 6C shows an example of the reset period RST and the signal period SIG in an LPD_HCG mode in which a sampling count corresponds to four times and the number of sampling bits corresponds to 10 bits. FIGS. 6A to 6C show a period, in which a comparison operation is performed, in shades of gray.

FIG. 6a may correspond to the LPD_HCG mode to which multiple sampling of FIG. 4 is not applied. Referring to FIG. 6A, in the reset period RST, a comparison operation (12-bit counting) between the reset signal and the ramp signal RAMP may be performed one time. In the signal period SIG, a comparison operation (12-bit counting) between the image signal and the ramp signal RAMP may be performed one time. Here, when only the sampling count is increased to 4 times while the number of sampling bits is maintained as 12 bits, an example embodiment of the present disclosure is shown as illustrated in FIG. 6B.

Referring to FIG. 6B, in the reset period RST, a comparison operation (12-bit counting) between the reset signal and the ramp signal RAMP may be performed four times. In the signal period SIG, a comparison operation (12-bit counting) between the image signal and the ramp signal RAMP may be performed four times. Dark random noise may decrease as the sampling count increases. However, as the total time required (or alternatively, used) for the LPD_HCG mode increases, the frame rate may decrease excessively. Accordingly, to minimize the decrease in the frame rate, it is necessary to increase the sampling count of the LPD_HCG mode and to decrease the number of sampling bits at the same time as shown in FIGS. 5A and Here, when the number of sampling bits is reduced to 10 bits, an example embodiment of the present disclosure is shown as illustrated in FIG. 6C.

FIG. 6C may correspond to the LPD_HCG mode to which multiple sampling of FIGS. 5A and 5B is applied. Referring to FIG. 6C, in the reset period RST, a comparison operation (10-bit counting) between the reset signal and the ramp signal RAMP may be performed four times. In the signal period SIG, a comparison operation (10-bit counting) between the image signal and the ramp signal RAMP may be performed four times. As compared to an example embodiment of FIG. 6B, the magnitude of the generated signal may be reduced due to the decrease in the number of sampling bits, and thus the improvement effect of SNR may be reduced. However, the degree of reduction is insignificant, and the overall time required (or alternatively, used) for the LPD_HCG mode is reduced as compared to the example embodiment of FIG. 6B, and thus a decrease in the frame rate may be minimized. Furthermore, the present disclosure is not limited thereto. For example, the LPD_HCG mode may be adjusted such that 11-bit counting is performed twice instead of 10-bit counting performed four times.

Figure 7A:
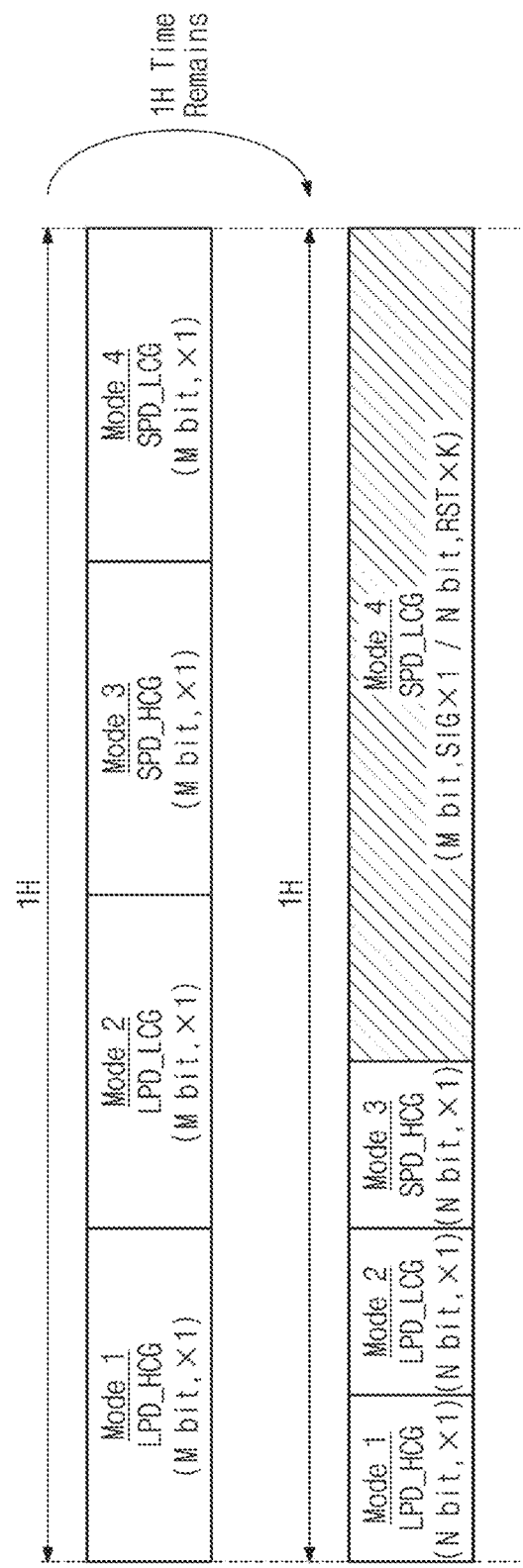
FIG. 7A shows an example of multiple sampling of an SPD_LCG mode in which 1H time is maintained.
Figure 7B:
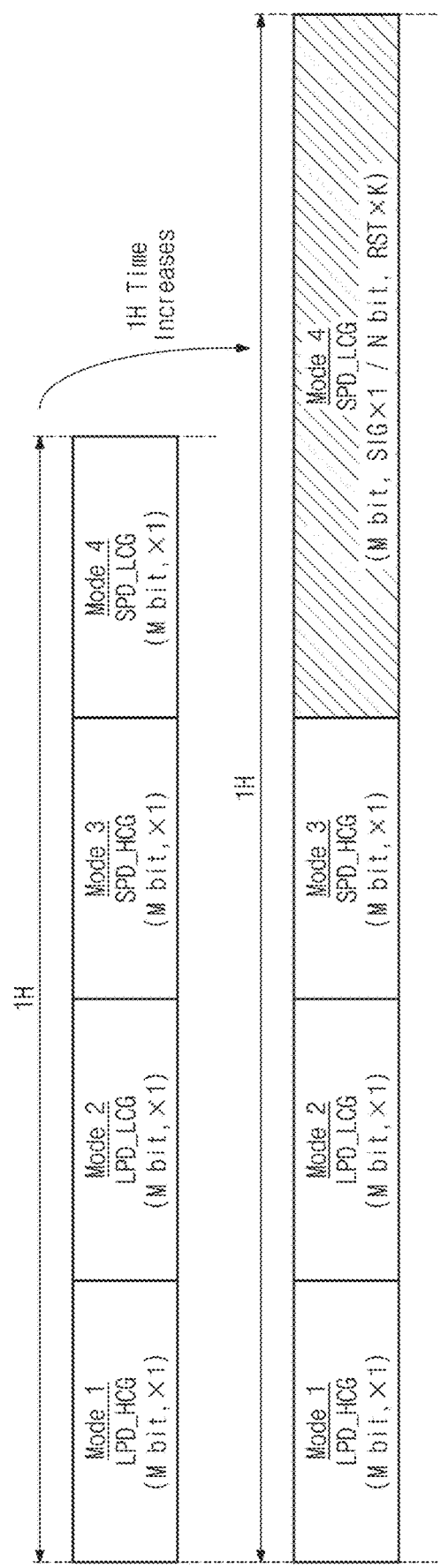
FIG. 7B shows an example of multiple sampling of an SPD_LCG mode in which 1H time increases.

FIG. 7A shows an example of multiple sampling of an SPD_LCG mode in which 1H time is maintained. FIG. 7B shows an example of multiple sampling of an SPD_LCG mode in which 1H time increases. Unlike the example embodiments of FIGS. 5A and 5B, in the case of the SPD_LCG mode shown in FIGS. 7A and 7B, the number of comparison operations of the signal period SIG may be maintained as one time, and only the number of comparison operations of the reset period RST may be increased to 'K' times.

Referring to FIG. 7A, the sampling count and the number of sampling bits of the signal period SIG of the SPD_LCG mode are maintained as one time and 'M' bits, respectively. However, the sampling count of the reset period RST increases from one time to 'K' times (1<K), and the number of sampling bits thereof may be reduced from 'M' bits to 'N' bits (M>N). However, as the sampling count of the reset period RST increases from one time to 'K' times, the time required (or alternatively, used) for the SPD_LCG mode may increase. As the number of sampling bits of each of (or alternatively, at least one of) the remaining modes LPD_HCG, LPD_LCG, and SPD_HCG decreases from 'M' bits to 'N' bits, 1H time remains as shown in FIG. 4. As a result, the frame rate may be maintained.

In the meantime, referring to FIG. 7B, as illustrated in FIGS. 7A, the sampling count of the reset period RST of the SPD_LCG mode may increase from one time to 'K' times, and the number of sampling bits thereof may decrease from 'M' bits to 'N' bits. However, unlike the illustration of FIG. 7A, as the number of sampling bits and the sampling count of each of (or alternatively, at least one of) the remaining modes LPD_HCG, LPD_LCG, and SPD_HCG are maintained even though the time required (or alternatively, used) for the SPD_LCG mode increases, 1H time increases compared to the example of FIG. 7A.

Furthermore, in the case of the SPD_LCG mode shown in FIGS. 7A and 7B, a floating diffusion region may be reset by activating the reset control signal RS for each comparison operation of the reset period RST, which is repeated K times. As described with reference to FIG. 4, because the SPD_LCG mode corresponds to the incomplete CDS readout method, KT/C noise is not completely removed. As such, the KT/C noise may be randomly generated through such repetitive resetting, and the KT/C noise may be reduced due to the averaging effect obtained through 'K' repetitions.

Similarly to that described with reference to FIGS. 5A and 5B, when the example embodiment of FIG. 7A is compared with the example embodiment of FIG. 7B, the sampling count and the number of sampling bits of SPD_LCG mode are the same, KT/C noise reduction effect may be the same. In the case of FIG. 7A, because the number of sampling bits in each of (or alternatively, at least one of) the remaining modes is reduced, the SNR improvement effect may be smaller than that of FIG. 7B, but the frame rate may be maintained. On the other hand, in the case of FIG. 7B, the SNR improvement effect may be greater than that of FIG. 7A, but the frame rate may decrease as the 1H time increases.

Figure 8:
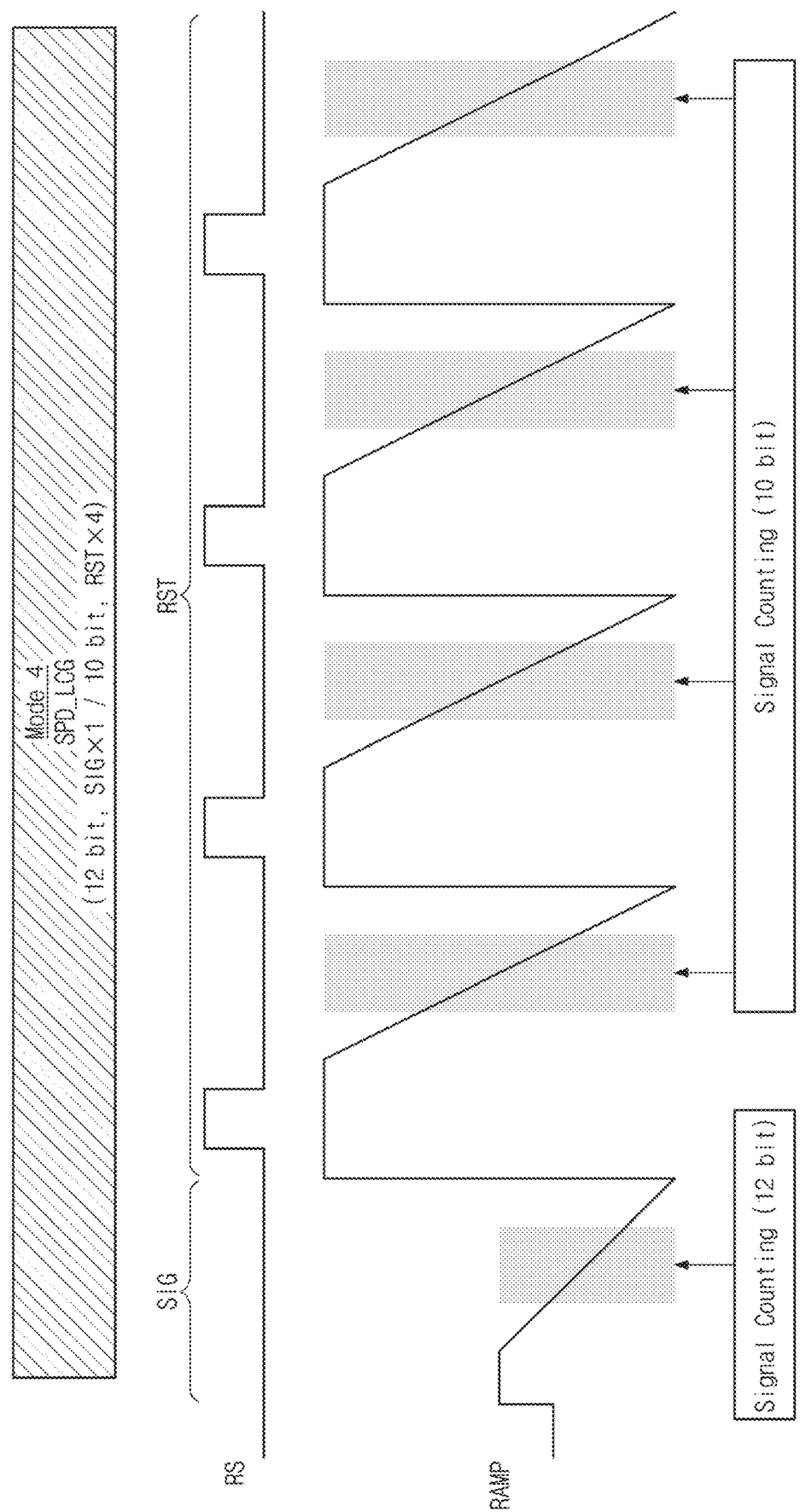
FIG. 8 shows an example of a signal period of an SPD_LCG mode, in which a sampling count is one time and the number of sampling bits is 12 bits, and a reset period in an SPD_LCG mode in which a sampling count is four times and the number of sampling bits is 10 bits.

FIG. 8 shows an example of the signal period SIG of an SPD_LCG mode, in which a sampling count is one time and the number of sampling bits is 12 bits, and the reset period RST in an SPD_LCG mode in which a sampling count is four times and the number of sampling bits is 10 bits. FIG. 8 may correspond to the SPD_LCG mode to which multiple sampling is applied.

Referring to FIG. 8, in the signal period SIG, a comparison operation (e.g., 12-bit counting) between the image signal and the ramp signal RAMP may be performed one time. In the reset period RST, a comparison operation (e.g., 10-bit counting) between the reset signal and the ramp signal RAMP may be performed four times. Moreover, as described above, before each of (or alternatively, at least one of) the compare operations of the reset period RST, the reset control signal RS may be activated such that a floating diffusion region FD1 (e.g., the first floating diffusion region FD1 in FIG. 3) is capable of being repeatedly reset. For this reason, KT/C noise may be randomly generated at every sampling, and the KT/C noise may be reduced due to an averaging effect through K repetitions.

In the meantime, it is described that 1H time as shown in FIG. 4 is maintained through the readout mode of FIGS. 5A and 7A. However, the present disclosure is not limited thereto. For example, 1H time may be reduced as compared to the example embodiment of FIG. 4 by adjusting the number of sampling bits and sampling count of each of (or alternatively, at least one of) the LPD_HCG mode and the SPD_LCG mode as shown in FIGS. 5A and 7A.

Figure 9:
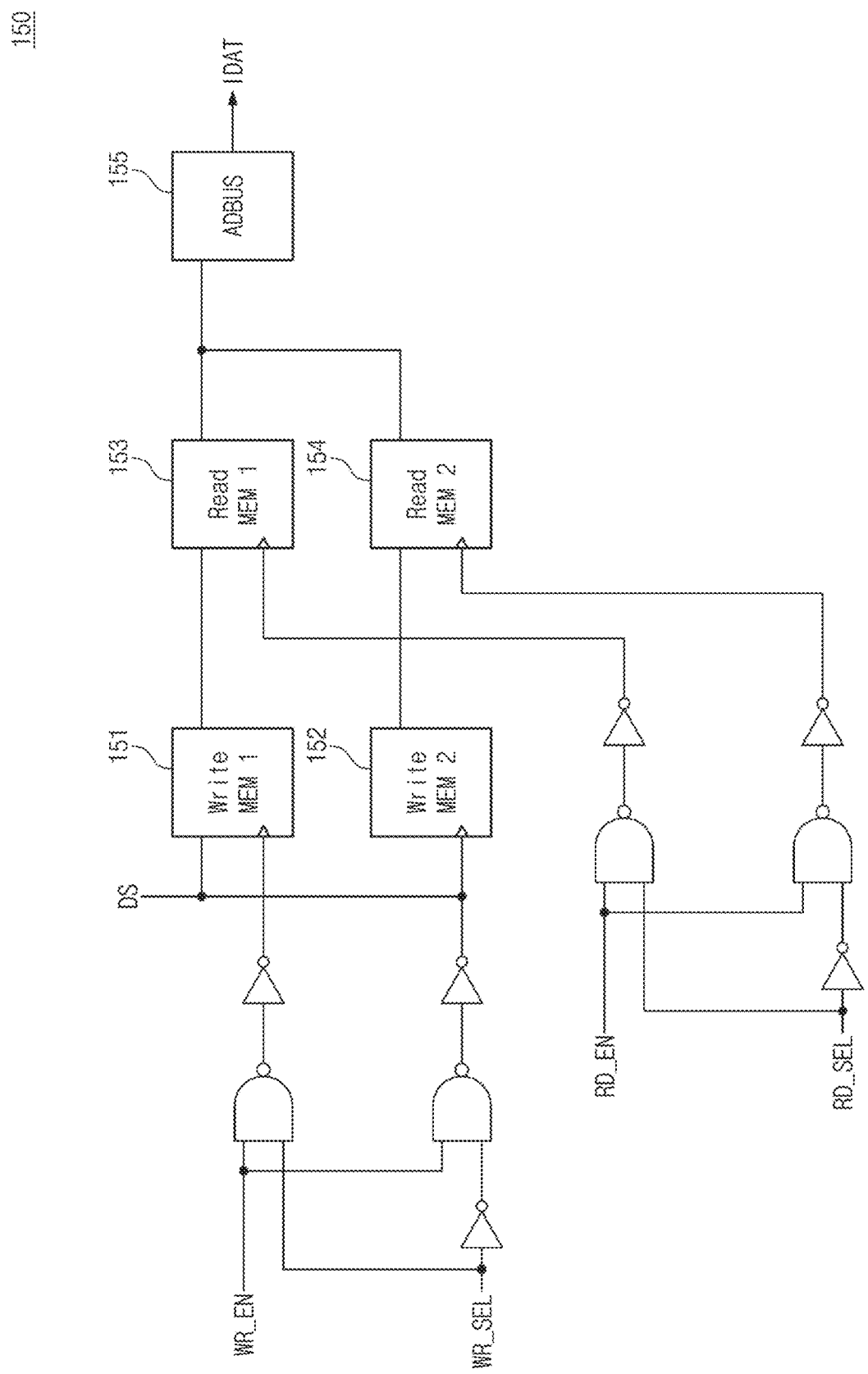
FIG. 9 shows an example of a configuration of a data bus of FIG. 2.

FIG. 9 shows an example of a configuration of the data bus 150 of FIG. 2. Referring to FIG. 9, the data bus 150 includes a plurality of inverters, a plurality of logic gates, a plurality of write memories 151 and 152, a plurality of read memories 153 and 154, and an advanced data bus (ADBUS) 155. The plurality of logic gates in FIG. 9 are shown to be NAND gates. The present disclosure is not limited thereto. For example, the data bus 150 may be implemented by using other types of logic gates. Below, FIG. 9 will be described with reference to FIG. 2.

The data bus 150 may receive a digital signal DS from the ADC circuit 140 and may receive a write enable signal WR_EN, a write selection signal WR_SEL, a read enable signal RD_EN, and a read selection signal RD_SEL from the enable signal generator 160. For example, the digital signal DS may correspond to data read out through sequential operations of modes LPD_HCG, LPD_LCG, SPD_HCG, and SPD_LCG in the pixel PX. Moreover, when multiple sampling is applied, a digital value generated at every sampling may be accumulated based on a counting operation of a counter so as to be output as the digital signal DS and to be provided to the data bus 150.

The received digital signal DS may be stored in one of the plurality of write memories 151 and 152 in response to the write enable signal WR_EN of a high level. A write memory, which is to be stored, from among the plurality of write memories 151 and 152 may be determined by the write selection signal WR_SEL. For example, when the write enable signal WR_EN is at a high level and the write selection signal WR_SEL is at a low level, the digital signal DS may be stored in the write memory 151. When the write enable signal WR_EN is at a high level and the write selection signal WR_SEL is at a high level, the digital signal DS may be stored in the write memory 152.

The plurality of read memories 153 and 154 may read out the digital signal DS stored in the corresponding plurality of write memories 151 and 152 in response to the read enable signal RD_EN of a high level. A read memory, which is to be used, from among the plurality of read memories 153 and 154 may be determined by the read selection signal RD_SEL. For example, when the read enable signal RD_EN is at a high level and the read selection signal RD_SEL is at a low level, the read memory 153 may read the digital signal DS stored in the write memory 151. When the read enable signal RD_EN is at a high level and the read selection signal RD_SEL is at a high level, the read memory 154 may read the digital signal DS stored in the write memory 152.

The digital signal DS loaded into the plurality of read memories 153 and 154 may be stored in the ADBUS 155. The digital signal DS stored in the ADBUS 155 may be amplified through a sense amplifier (not shown) and may be provided to the image signal processor 16 of FIG. 1 as the image data IDAT under control of a column decoder (not shown).

Figure 10A:
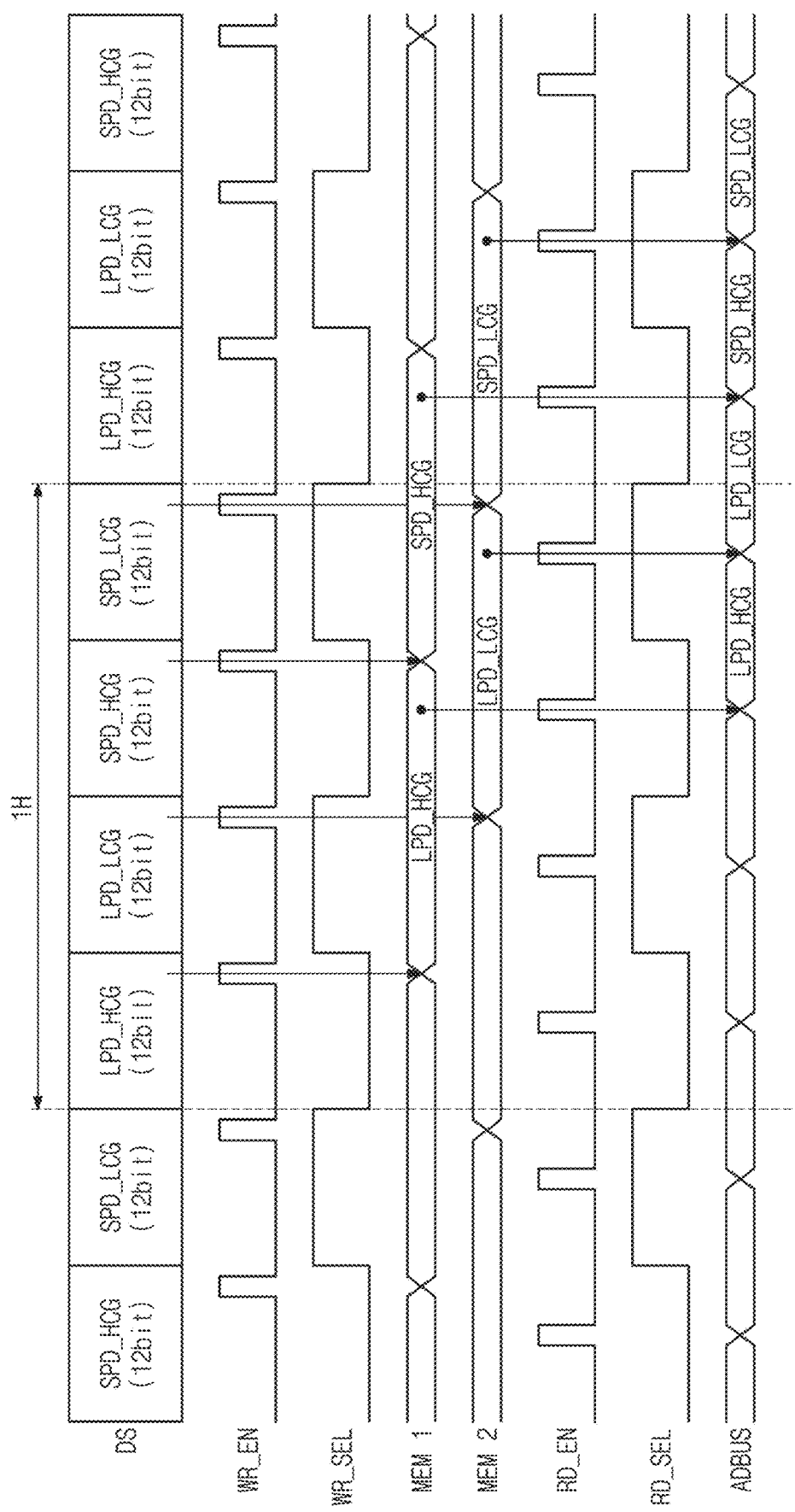
FIG. 10A is a timing diagram illustrating an example of an operation of a data bus of FIG. 9 when multiple sampling is not applied.
Figure 10B:
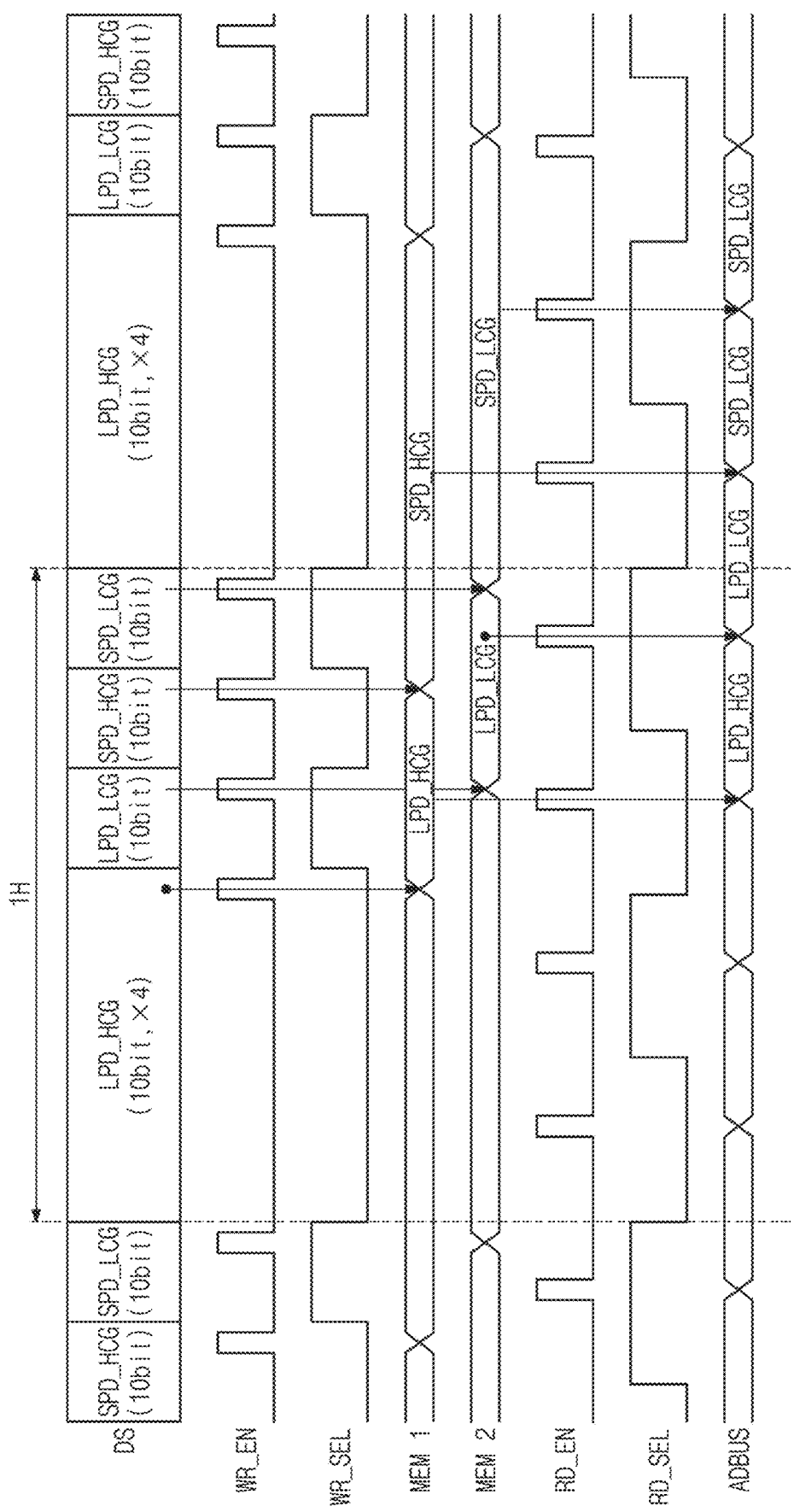
FIG. 10B is a timing diagram illustrating an example of an operation of a data bus of FIG. 9 when multiple sampling where 1H time is maintained is applied to an LPD_HCG mode.
Figure 10C:
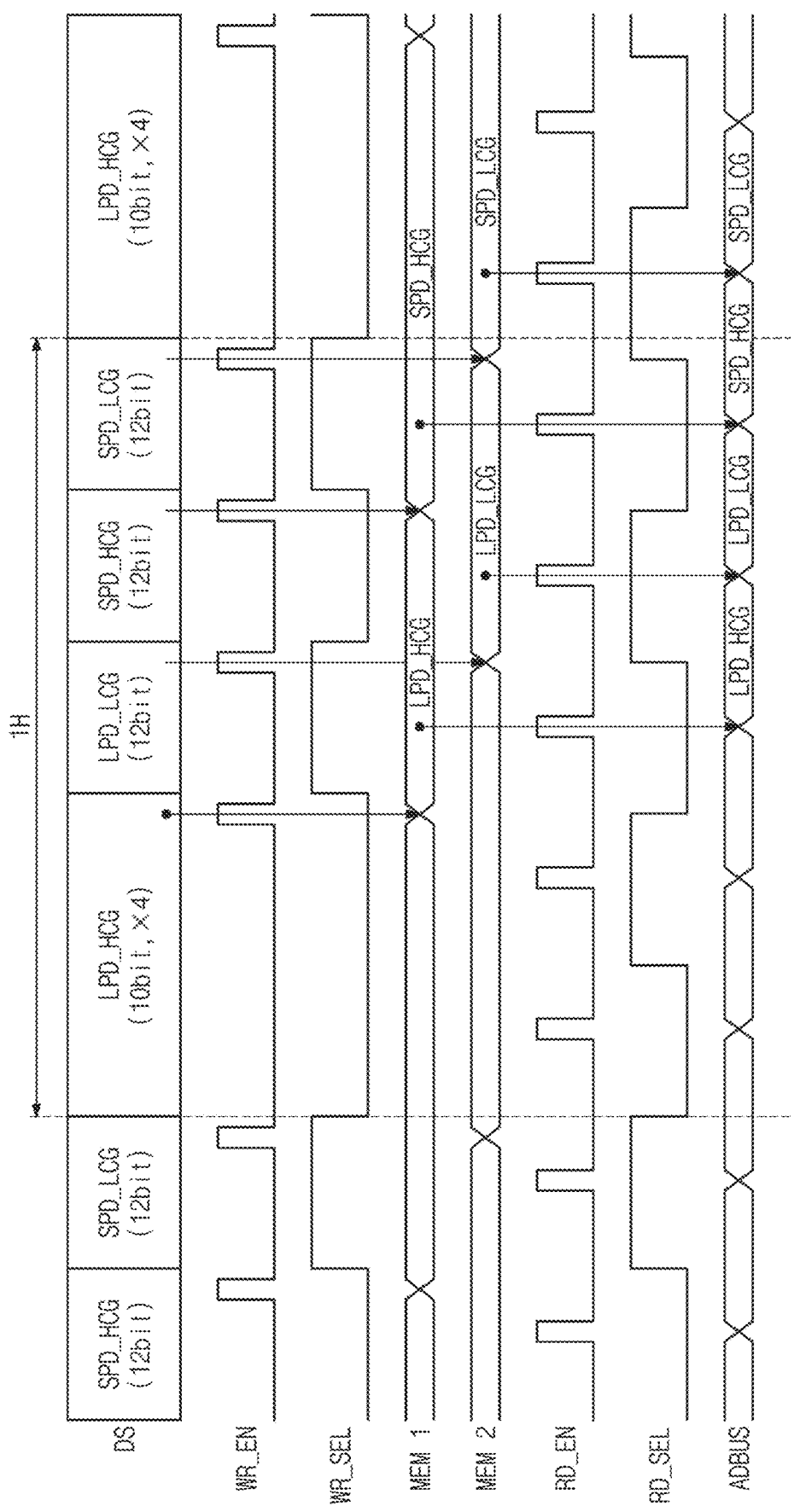
FIG. 10C is a timing diagram illustrating an example of an operation of a data bus of FIG. 9 when multiple sampling in which 1H time increases is applied to an LPD_HCG mode.

FIG. 10A is a timing diagram illustrating an example of an operation of the data bus 150 of FIG. 9 when multiple sampling is not applied. FIG. 10B is a timing diagram illustrating an example of an operation of the data bus 150 of FIG. 9 when multiple sampling where 1H time is maintained is applied to an LPD_HCG mode. FIG. 10C is a timing diagram illustrating an example of an operation of the data bus 150 of FIG. 9 when multiple sampling in which 1H time increases is applied to an LPD_HCG mode. In FIGS. 10A to 10C, MEM 1 may correspond to the write memory 151 or the read memory 153 of FIG. 9, and MEM 2 may correspond to the write memory 152 or the read memory 154 of FIG. 9. Below, FIG. 9 will be described with reference to FIGS. 10A to 10C.

Referring to FIG. 10A, during 1H time, the digital signal DS may include pixel data sequentially read out in modes LPD_HCG, LPD_LCG, SPD_HCG, and SPD_LCG. FIG. 10A may correspond to a case where multiple sampling is not applied, and thus the number of sampling bits for each mode may be 12 bits, and a sampling count may be one time.

First of all, data corresponding to the LPD_HCG mode may be stored in the write memory 151 in response to the write enable signal WR_EN of a high level and the write selection signal WR_SEL of a low level. Data corresponding to the LPD_LCG mode may be stored in the write memory 152 in response to the write enable signal WR_EN of a high level and the write selection signal WR_SEL of a high level.

Afterward, the read memory 153 may read data corresponding to the LPD_HCG mode stored in the write memory 151 in response to the read enable signal RD_EN of a high level and the read selection signal RD_SEL of a low level. The read memory 154 may read data corresponding to the LPD_LCG mode stored in the write memory 152 in response to the read enable signal RD_EN of a high level and the read selection signal RD_SEL of a high level. The data loaded by the read memories 153 and 154 may be transmitted to the ADBUS 155 to output the image data IDAT.

After the read memories 153 and 154 respectively read LPD readout data stored in the write memories 151 and 152, data corresponding to the SPD_HCG mode and data corresponding to the SPD_LCG mode may be stored in the write memories 151 and 152 in the same manner, and may be transmitted to the ADBUS 155 by the read memories 153 and 154. The above-described procedure shows an operation during 1H time, and may be repeated for every readout operation.

FIG. 10B may correspond to a case where 1H time is maintained as illustrated in FIG. 5A, and FIG. 10C may correspond to a case where 1H time increases as illustrated in FIG. 5B. In FIGS. 10B and 10C, a series of operations of storing the digital signal DS in the write memories 151 and 152, loading the digital signal DS through the read memories 153 and 154, and transmitting the digital signal DS to the ADBUS 155 are the same as a series of operations described with reference to FIG. 10A, and thus additional descriptions will be omitted to avoid redundancy.

Referring to FIGS. 10B and 10C, differently from that shown in FIG. 10A, a length (e.g., a length of period during which the write memories 151 and 152 store data) of a period, during which levels of the write enable signal WR_EN and the write selection signal WR_SEL remain at high levels, and a length of a period, during which levels of the write enable signal WR_EN and the write selection signal WR_SEL remain at low levels, may be adjusted based on the changed sampling count and the changed number of sampling bits of a readout mode. For example, the timing controller 170 of FIG. 2 may control the signal generation timing of the enable signal generator 160 based on the sampling count and the number of sampling bits for each readout mode stored in a register. As such, data stored based on the write enable signal WR_EN and the write selection signal WR_SEL, which are adjusted differently, may be stored alternately in the two write memories 151 and 152, and thus the data may be stored to be longer as compared with a case where only one memory is used.

In other words, there are two write memories and two read memories, and the write enable signal WR_EN and the write selection signal WR_SEL related to a write operation are adjusted. Accordingly, even when the sampling count and the number of sampling bits of each readout mode are changed, the image data IDAT may be generated properly. FIGS. 10B and 10C show an example embodiment in which multiple sampling is applied to LPD_HCG mode. However, even when multiple sampling is applied to the SPD_LCG mode, the image data IDAT may be generated through a similar operation.

Figure 11:
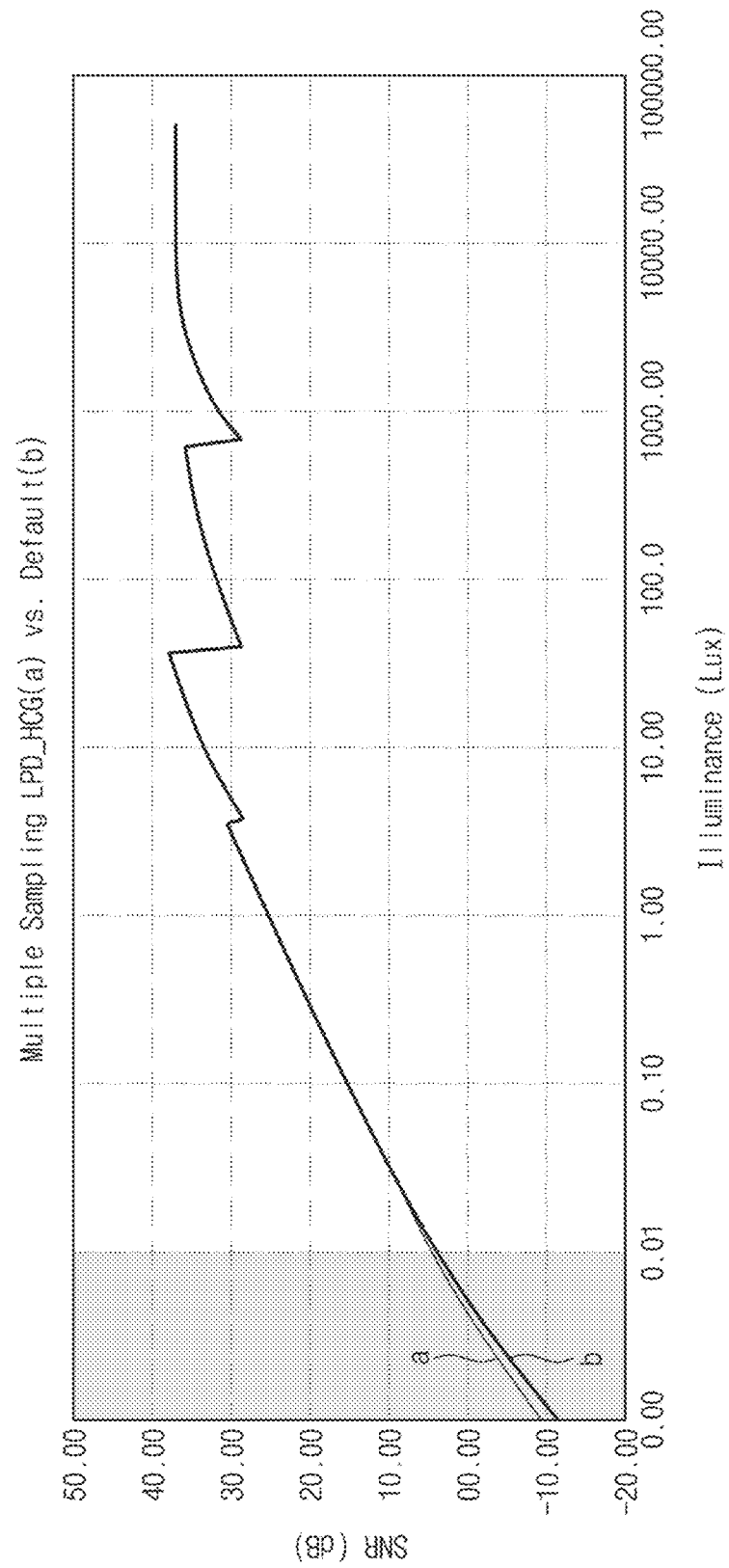
FIG. 11 shows a result of comparing between SNR in a case where multiple sampling is applied to an LPD_HCG mode and SNR in a case where multiple sampling is not applied.
Figure 12:
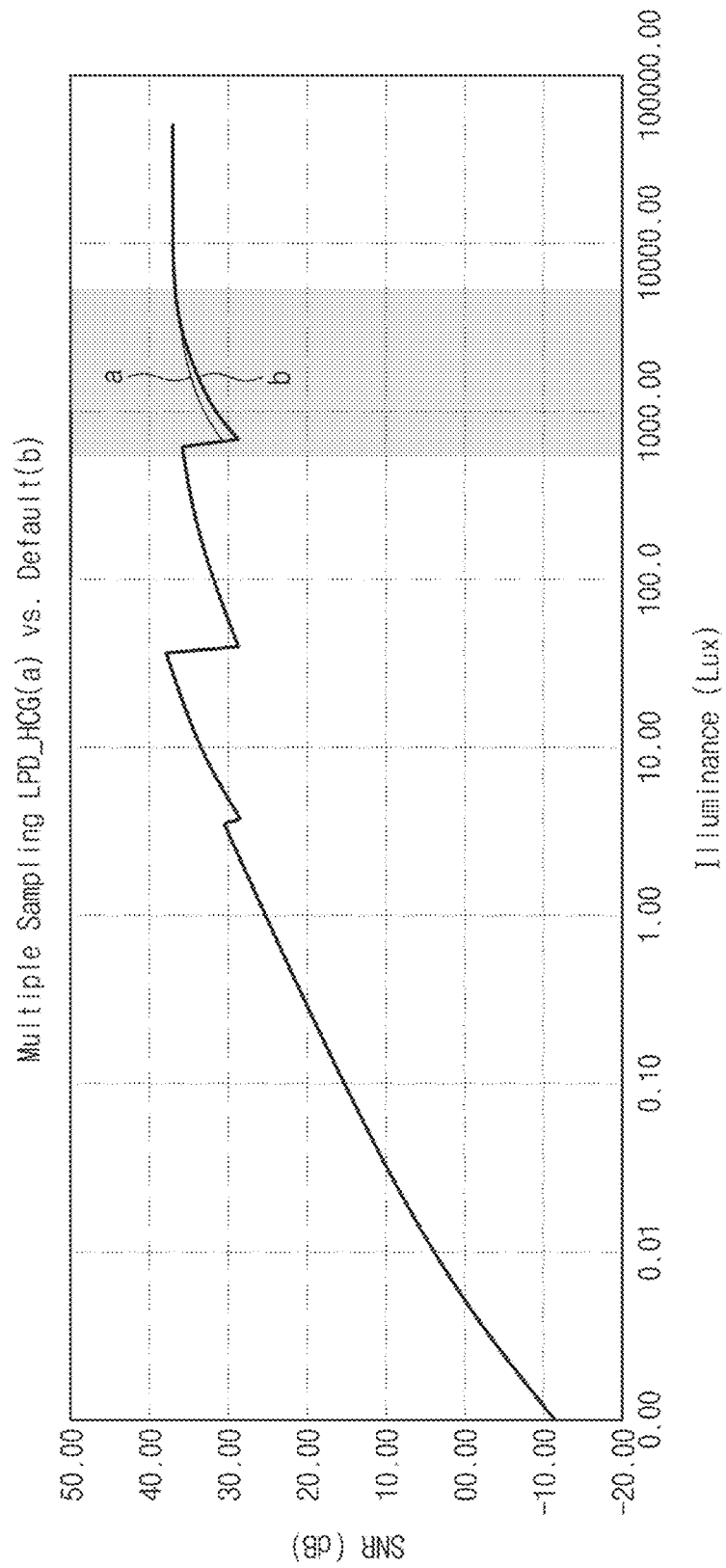
FIG. 12 shows a result of comparing between SNR in a case where multiple sampling is applied to an SPD_LCG mode and SNR in a case where multiple sampling is not applied.

FIG. 11 shows a result of comparing between SNR in a case (a) where multiple sampling is applied to an LPD_HCG mode and SNR in a case (b) where multiple sampling is not applied. FIG. 12 shows a result of comparing between SNR in a case (a) where multiple sampling is applied to an SPD_LCG mode and SNR in a case (b) where multiple sampling is not applied (e.g., a default case). Referring to FIG. 11, as described with reference to FIGS. 5A and 5B, it may be seen that SNR is improved due to the reduction of dark random noise in an extreme low-illumination period. Referring to FIG. 12, as described with reference to FIGS. 7A and 7B, it may be seen that SNR is improved due to the reduction of KT/C noise in an extreme high-illumination period. FIGS. 11 and 12 show a period, in which the SNR is improved, in shades of gray.

Figure 13:
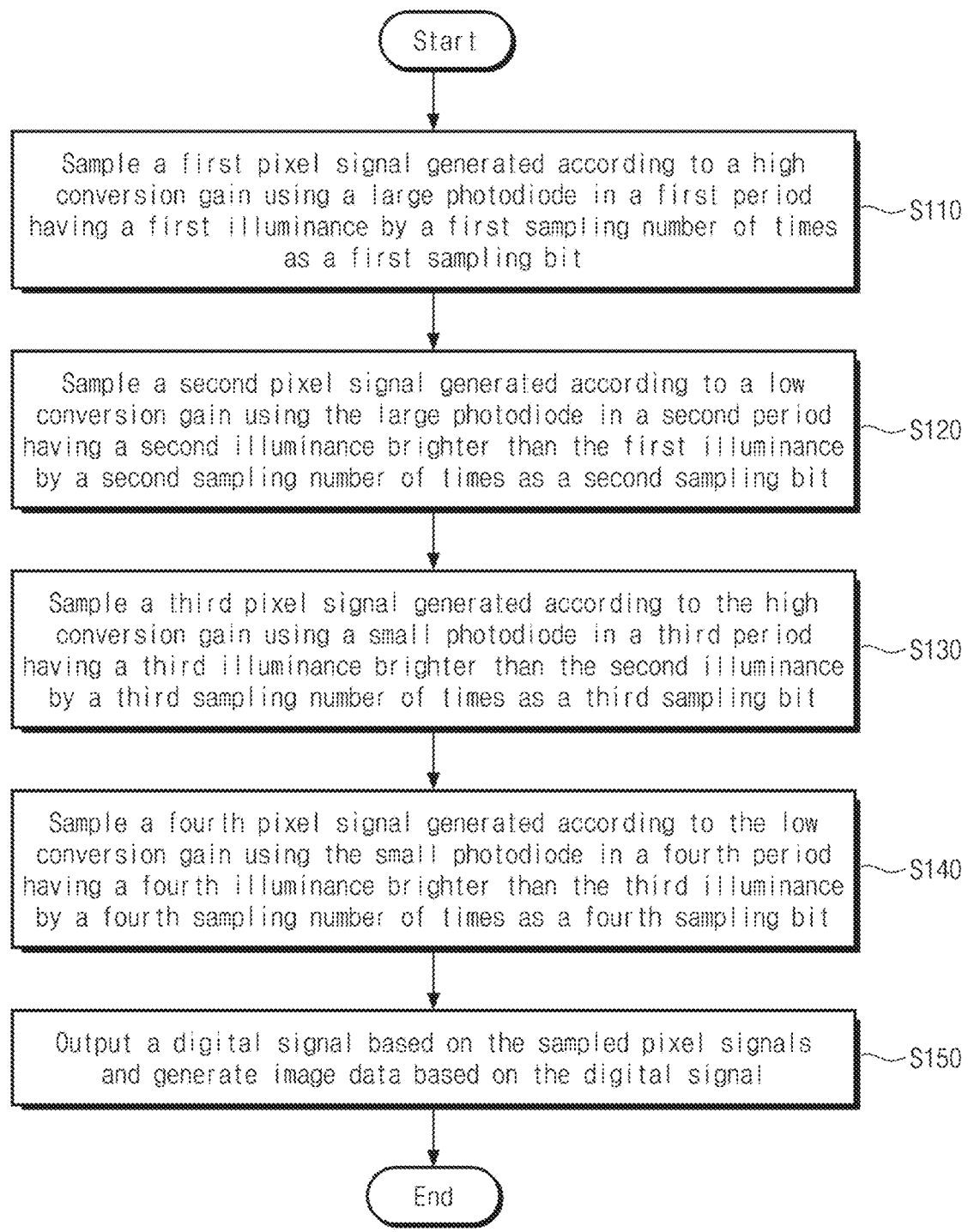
FIG. 13 is a flowchart illustrating an example of an operating method of an image sensor performing selective multiple sampling, according to an example embodiment of the present disclosure.

FIG. 13 is a flowchart illustrating an example of an operating method of an image sensor performing selective multiple sampling, according to an example embodiment of the present disclosure. Below, FIG. 13 will be described with reference to FIGS. 2 to 4.

In operation S110, the ADC circuit 140 may sample a pixel signal (e.g., a pixel signal generated according to an LPD-HCG mode) generated according to a high conversion gain by using the large photodiode LPD in a first period having first illumination by a first sampling number of times as a first sampling bit. In operation S120, the ADC circuit 140 may sample a pixel signal (e.g., a pixel signal generated according to an LPD-LCG mode) generated according to a low conversion gain by using the large photodiode LPD in a second period having second illumination brighter than the first illumination by a second sampling number of times as a second sampling bit.

In operation S130, the ADC circuit 140 may sample a pixel signal (e.g., a pixel signal generated according to an SPD-HCG mode) generated according to a high conversion gain by using the small photodiode SPD in a third period having third illumination brighter than the second illumination by a third sampling number of times as a third sampling bit. In operation S140, the ADC circuit 140 may sample a pixel signal (e.g., a pixel signal generated according to an SPD-LCG mode) generated according to a low conversion gain by using the small photodiode SPD in a fourth period having fourth illumination brighter than the third illumination by a fourth sampling number of times as a fourth sampling bit.

Basically, the number of sampling bits may be 12 bits, and the sampling count may be one time. As described with reference to FIGS. 5A, 5B, 7A, and 7B, multiple sampling may be applied to the LPD-HCG mode to remove dark random noise, and multiple sampling may be applied to the SPD-LCG mode to eliminate or reduce KT/C noise.

For example, when multiple sampling is applied to the LPD-HCG mode, the number of sampling bits in the LPD-HCG mode may decrease to 10 bits, and the sampling count may increase to 4 times. The number of sampling bits of each of (or alternatively, at least one of) the remaining modes may decrease to 10 bits or may be maintained as 12 bits. A case where multiple sampling is applied to the SPD-LCG mode is similar to this. However, in case of the SPD-LCG mode, the number of sampling bits of the reset period RST may decrease and the sampling count may increase. In addition, the number of sampling bits and the sampling count of the signal period SIG may be maintained as they are.

Afterward, in operation S150, the ADC circuit 140 may output a digital signal to the data bus 150 based on the sampled pixel signals, and the data bus 150 may output the image data IDAT to the image signal processor 16 of FIG. 1 under control of the enable signal generator 160.

Figure 14:
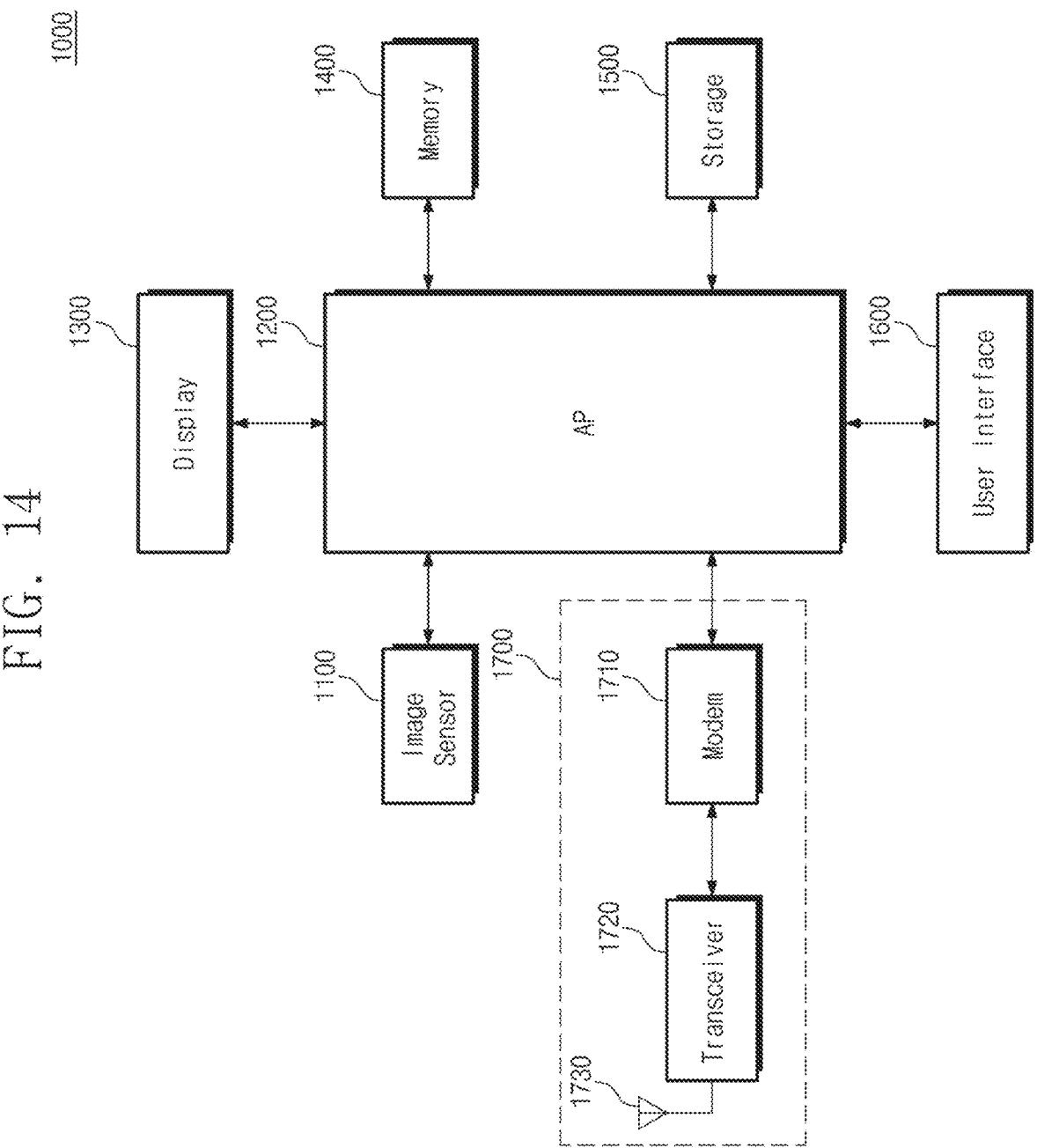
FIG. 14 illustrates an example of a configuration of an electronic device including an image sensor, according to an example embodiment of the present disclosure.

FIG. 14 illustrates an example of an electronic device including an image sensor, according to an example embodiment of the present disclosure. Referring to FIG. 14, an electronic device 1000 may include an image sensor 1100, an application processor (AP) 1200, a display 1300, a memory 1400, storage 1500, a user interface 1600, and a wireless transceiver 1700. The image sensor 1100 of FIG. 14 may correspond to the image sensor 100 of FIG. 2, and a description the same as the description of the image sensor 100 of FIG. 2 will be omitted to avoid redundancy.

The application processor 1200 may control overall operations of the electronic device 1000 and may be implemented with a system on chip (SoC) that drives an application program, an operating system, and the like. The application processor 1200 may receive image data from the image sensor 1100 and may perform image processing on the received image data. According to an example embodiment, the application processor 1200 may store received image data and/or processed image data in the memory 1400 or the storage 1500. Moreover, according to an example embodiment of the present disclosure, the application processor 1200 may adjust the sampling count and the number of sampling bits for each pixel readout mode LPD_HCG, LPD_LCG, SPD_HCG, or SPD_LCG by setting a register value inside the timing controller of the image sensor 1100.

The memory 1400 may store programs and/or data processed or executed by the application processor 1200. The storage 1500 may be implemented as a non-volatile memory device such as NAND flash or resistive memory. For example, the storage 1500 may be provided as a memory card (MMC, eMMC, SD, or micro SD). The storage 1500 may store data and/or programs for an execution algorithm for controlling an image processing operation of the application processor 1200. When an image processing operation is performed, the data and/or programs may be loaded into the memory 1400. The user interface 1600 may be implemented with various devices, which are capable of receiving a user input, such as a keyboard, a curtain key panel, a touch panel, a fingerprint sensor, and a microphone. The user interface 1600 may receive a user input and may provide a signal corresponding to the received user input to the application processor 1200. The wireless transceiver 1700 may include a modem 1710, a transceiver 1720, and an antenna 1730.

The above description refers to example embodiments for implementing the present disclosure. Example embodiments in which a design is changed simply or which are easily changed may be included in the present disclosure as well as an example embodiment described above. In addition, technologies that are easily changed and implemented by using the above example embodiments may be included in the present disclosure. While the present disclosure has been described with reference to example embodiments thereof, it will be apparent to those of ordinary skill in the art that various changes and modifications may be made thereto without departing from the spirit and scope of the present disclosure as set forth in the following claims.

According to an example embodiment of the present disclosure, multiple sampling may be selectively applied based on a readout mode.

In particular, according to an example embodiment of the present disclosure, a frame rate reduction involved in noise reduction may be minimized by adjusting the driving time of each readout mode.

Any of the elements and/or functional blocks disclosed above may include or be implemented in processing circuitry such as hardware including logic circuits; a hardware/software combination such as a processor executing software; or a combination thereof. For example, the image signal processor 16, timing controller 170 and AP 1200 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An image sensor comprising:
a pixel array including a plurality of pixels, each of the plurality of pixels including a first photodiode and a second photodiode, the first photodiode having a first light receiving area, the second photodiode having a second light receiving area greater than the first light receiving area, each of the plurality of pixels configured to output a first pixel signal based on a first conversion gain by using the second photodiode in a first period, output a second pixel signal based on a second conversion gain by using the second photodiode in a second period, output a third pixel signal based on the first conversion gain by using the first photodiode in a third period, and output a fourth pixel signal based on the second conversion gain by using the first photodiode in a fourth period;
an analog-to-digital converter (ADC) circuit configured to output a digital signal by performing sampling on a reset signal and an image signal of each of the first pixel signal, the second pixel signal, the third pixel signal, and the fourth pixel signal; and
a timing controller configured to control an operation of the ADC circuit,
wherein the first conversion gain is higher than the second conversion gain,
wherein the timing controller is configured to adjust a sampling count and a number of sampling bits associated with the sampling differently for each of the first period, the second period, the third period, and the fourth period, and
wherein the timing controller includes a register for adjusting the sampling count and the number of sampling bits.

2. The image sensor of claim 1, wherein
the timing controller is configured to adjust the sampling count of the first period to increase from one time to 'K' times, and the number of sampling bits of the first period to decrease from 'M' bits to 'N' bits, 'K,' 'M,' and "N" being integers,
the timing controller is configured to adjust the sampling count of each of the second period, the third period, and the fourth period to be maintained as one time, and the number of sampling bits of each of the second period, the third period, and the fourth period to be maintained from the 'M' bits to the 'N' bits, and
a length of each of the first period, the second period, the third period, and the fourth period after the sampling count and the number of sampling bits are adjusted is the same as a respective length of each of the first period, the second period, the third period, and the fourth period before the sampling count and the sampling bit number are adjusted.

3. The image sensor of claim 1, wherein
the timing controller is configured to adjust the sampling count of the first period to increase from one time to 'K' times, and the number of sampling bits of the first period to decrease from 'M' bits to 'N' bits, 'K,' 'M,' and "N" being integers,
the timing controller is configured to adjust a sampling count of each of the second period, the third period, and the fourth period to be maintained as one time, and the number of sampling bits of each of the second period, the third period, and the fourth period to be maintained as 'M' bits, and a length of each of the first period, the second period, the third period, and the fourth period after the sampling count and the number of sampling bits are adjusted is longer than a respective length of each of the first period, the second period, the third period, and the fourth period before the sampling count and the sampling bit number are adjusted.

4. The image sensor of claim 1, wherein the timing controller is configured to adjust the sampling count of the reset signal of the fourth period to increase from one time to 'K' times, and the number of sampling bits of the reset signal of the fourth period to decrease from 'M' bits to 'N' bits, 'K,' 'M,' and "N" being integers, the timing controller is configured to adjust the sampling count of each of the first period, the second period, and the third period to be maintained as one time, and the number of sampling bits of each of the first period, the second period, and the third period to be maintained from the 'M' bits to the 'N' bits, and a length of each of the first period, the second period, the third period, and the fourth period after the sampling count and the number of sampling bits are adjusted is the same as a respective length of each of the first period, the second period, the third period, and the fourth period before the sampling count and the sampling bit number are adjusted.

5. The image sensor of claim 1, wherein the timing controller is configured to adjust the sampling count of the reset signal of the fourth period to increase from one time to 'K' times, and the number of sampling bits of the reset signal of the fourth period to decrease from 'M' bits to 'N' bits, 'K,' 'M,' and "N" being integers, the timing controller is configured to adjust the sampling count of each of the first period, the second period, and the third period to be maintained as one time, and the number of sampling bits of each of the first period, the second period, and the third period to be maintained as 'M' bits, and a length of each of the first period, the second period, the third period, and the fourth period after the sampling count and the number of sampling bits are adjusted is longer than a respective length of each of the first period, the second period, the third period, and the fourth period before the sampling count and the sampling bit number are adjusted.

6. The image sensor of claim 5, wherein, the ADC is configured such that whenever the reset signal of the fourth pixel signal is sampled in the fourth period, a voltage of a first floating diffusion region where a charge generated by the first photodiode is stored is reset.

7. The image sensor of claim 1, further comprising:

a data bus including a first memory and a second memory and configured to receive the digital signal and to output image data, wherein, the first memory is configured to store a first signal corresponding to the first period or a third signal corresponding to the third period among the digital signal, and the second memory is configured to store a second signal corresponding to the second period or a fourth signal corresponding to the fourth period among the digital signal, and wherein the timing controller is configured such that a time during which the first memory store the first signal or the third signal, or a time during which the second memory store the second signal or the fourth signal, is adjusted differently based on the sampling count and the sampling bit number of each of the first pixel signal, the second pixel signal, the third pixel signal, and the fourth pixel signal.

8. The image sensor of claim 1, wherein the pixel array is configured to sequentially outputs the first pixel signal, the second pixel signal, the third pixel signal, and the fourth pixel signal based on the first period, the second period, the third period, and the fourth period.

9. An image sensor comprising:

a pixel array including a plurality of pixels and configured to output a pixel signal from the plurality of pixels;

an analog-to-digital converter (ADC) circuit configured to output a digital signal by performing sampling on a reset signal and an image signal of the pixel signal; and a timing controller configured to control an operation of the ADC circuit, wherein each of the plurality of pixels includes:

a first photodiode having a first light receiving area;

a second photodiode having a second light receiving area greater than the first light receiving area;

a capacitor connected to a first floating diffusion region configured to store a charge generated by the first photodiode;

a first transistor connected to the capacitor;

a second transistor connected between the first floating diffusion region and a second floating diffusion region; and a third transistor connected between the second floating diffusion region and a third floating diffusion region configured to store a charge generated by the second photodiode, and wherein the timing controller is configured to adjust a sampling count and a number of sampling bits, which are associated with the sampling, differently based on whether each of the first transistor, the second transistor, and the third transistor is turned on, and the timing controller includes a register for adjusting the sampling count and the number of sampling bits.

10. The image sensor of claim 9, wherein the capacitor stores a charge overflowing in the first photodiode, in response to the first transistor being turned on, the capacitor is configured to increase capacitance of the first floating diffusion region, the first photodiode is configured to operate in response to the second transistor being turned on, and the second photodiode is configured to operate in response to the second transistor being turned off, in response to the third transistor being turned on, capacitance of each of the second floating diffusion region and the third floating diffusion region increases, the first photodiode is configured to operate based on a first conversion gain in response to the first transistor being turned off, and operate based on a second conversion gain lower than the first conversion gain in response to the first transistor being turned on, and the second photodiode is configured to operate based on the first conversion gain in response to the third transistor being turned off, and operate based on the second conversion gain in response to the third transistor being turned on.

11. The image sensor of claim 9, wherein each of the plurality of pixels is configured to:
output a first pixel signal by using the second photodiode in a first period in which the second transistor is turned off and the third transistor is turned off;
output a second pixel signal by using the second photodiode in a second period in which the second transistor is turned off and the third transistor is turned on;
output a third pixel signal by using the first photodiode in a third period in which the first transistor is turned off and the second transistor is turned on; and
output a fourth pixel signal by using the first photodiode in a fourth period in which the first transistor is turned on and the second transistor is turned on.

12. The image sensor of claim 11, wherein
the timing controller is configured to adjust the sampling count of the first period to increase from one time to 'K' times, and the number of sampling bits of the first period to decrease from 'M' bits to 'N' bits, 'K,' 'M,' and "N' being integers,
the timing controller is configured to adjust the sampling count of each of the second period, the third period, and the fourth period to be maintained as one time, and the number of sampling bits of each of the second period, the third period, and the fourth period to be maintained from the 'M' bits to the 'N' bits and
a length of each of the first period, the second period, the third period, and the fourth period after the sampling count and the number of sampling bits are adjusted is the same as a respective length of each of the first period, the second period, the third period, and the fourth period before the sampling count and the sampling bit number are adjusted.

13. The image sensor of claim 11, wherein
the timing controller is configured to adjust the sampling count of the first period to increase from one time to 'K' times, and the number of sampling bits of the first period to decrease from 'M' bits to 'N' bits, 'K,' 'M,' and "N' being integers,
the timing controller is configured to adjust the sampling count of each of the second period, the third period, and the fourth period to be maintained as one time, and the number of sampling bits of each of the second period, the third period, and the fourth period to be maintained as 'M' bits, and
a length of each of the first period, the second period, the third period, and the fourth period after the sampling count and the number of sampling bits are adjusted is longer than a respective length of each of the first period, the second period, the third period, and the fourth period before the sampling count and the sampling bit number are adjusted.

14. The image sensor of claim 11, wherein
the timing controller is configured to adjust the sampling count of the reset signal of the fourth period to increase from one time to 'K' times, and the number of sampling bits of the reset signal of the fourth period to decrease from 'M' bits to 'N' bits, 'K,' 'M,' and "N' being integers,
the timing controller is configured to adjust the sampling count of each of the first period, the second period, and the third period to be maintained as one time, and the number of sampling bits of each of the first period, the second period, and the third period to be maintained from the 'M' bits to the 'N' bits, and
a length of each of the first period, the second period, the third period, and the fourth period after the sampling count and the number of sampling bits are adjusted is the same as a respective length of each of the first period, the second period, the third period, and the fourth period before the sampling count and the sampling bit number are adjusted.

15. The image sensor of claim 11, wherein
the timing controller is configured to adjust the sampling count of the reset signal of the fourth period to increase from one time to 'K' times, and the number of sampling bits of the reset signal of the fourth period to decrease from 'M' bits to 'N' bits, 'K,' 'M,' and "N' being integers,
the timing controller is configured to adjust the sampling count of each of the first period, the second period, and the third period to be maintained as one time, and the number of sampling bits of each of the first period, the second period, and the third period to be maintained as 'M' bits, and
a length of each of the first period, the second period, the third period, and the fourth period after the sampling count and the number of sampling bits are adjusted is longer than a respective length of each of the first period, the second period, the third period, and the fourth period before the sampling count and the sampling bit number are adjusted.

16. The image sensor of claim 11, wherein
each of the plurality of pixels further includes a fourth transistor connected to the second floating diffusion region and configured to reset a voltage of each of floating diffusion regions, and
the ADC circuit is configured such that whenever the reset signal of the fourth pixel signal is sampled in the fourth period, a voltage of the first floating diffusion region where the charge generated by the first photodiode is stored is reset by turning on the fourth transistor.

17. An operating method of an image sensor, the method comprising:
sampling a first pixel signal, the first pixel signal being generated based on a first conversion gain by using a second photodiode in a first period, as a first sampling bit by a first sampling count;
sampling a second pixel signal, the second pixel signal being generated based on a second conversion gain lower than the first conversion gain by using the second photodiode in a second period, as a second sampling bit by a second sampling count;
sampling a third pixel signal, the third pixel signal being generated based on the first conversion gain by using a first photodiode having a first light receiving area smaller than a second light receiving area of the second photodiode in a third period, as a third sampling bit by a third sampling count;
sampling a fourth pixel signal, the third pixel signal being generated based on the second conversion gain by using the first photodiode in a fourth period, as a fourth sampling bit by a fourth sampling count; and
outputting a digital signal based on the sampled pixel signals and generating image data based on the digital signal.

18. The method of claim 17, wherein each of the second sampling count, the third sampling count, and the fourth sampling count is one time, and the first sampling count is greater than one time.

19. The method of claim 17, wherein the sampling of the fourth pixel signal as the fourth sampling bit by the fourth sampling count includes:

sampling an image signal of the fourth pixel signal one time; and sampling a reset signal of the fourth pixel signal by the fourth sampling count, and wherein each of the first sampling count, the second sampling count, the third sampling count is one time, and the fourth sampling count is greater than one time.

20. The method of claim 19, wherein the sampling of the reset signal of the fourth pixel signal by the fourth sampling count includes:

resetting a voltage of a floating diffusion region connected to the first photodiode by the fourth sampling count.

* * * * *